US011190661B2

United States Patent
Bermundo et al.

(10) Patent No.: US 11,190,661 B2
(45) Date of Patent: Nov. 30, 2021

(54) SCAN PRIVACY TOOL USING A MOBILE DEVICE FOR PRINTING OPERATIONS

(71) Applicant: KYOCERA DOCUMENT SOLUTIONS INC., Osaka (JP)

(72) Inventors: Neil-Paul Bermundo, Glendora, CA (US); Philip Ver Dabon, Torrance, CA (US)

(73) Assignee: Kyocera Document Solutions, Inc., Osaka (JP)

( * ) Notice: Subject to any disclaimer, the term of this patent is extended or adjusted under 35 U.S.C. 154(b) by 0 days.

(21) Appl. No.: 16/945,325

(22) Filed: Jul. 31, 2020

(65) Prior Publication Data

US 2020/0366796 A1 Nov. 19, 2020

Related U.S. Application Data

(63) Continuation-in-part of application No. 16/380,344, filed on Apr. 10, 2019, now Pat. No. 10,742,833, which is a continuation of application No. 15/476,493, filed on Mar. 31, 2017, now Pat. No. 10,298,795.

(51) Int. Cl.
*H04N 1/00* (2006.01)

(52) U.S. Cl.
CPC ....... *H04N 1/0087* (2013.01); *H04N 1/00875* (2013.01); *H04N 2201/0094* (2013.01)

(58) Field of Classification Search
CPC ............ H04N 1/4446; H04N 1/00392; H04N 1/0044; H04N 2201/0094; H04N 2201/328

See application file for complete search history.

(56) References Cited

U.S. PATENT DOCUMENTS

| 8,130,951 B2 | 3/2012 | Tian | |
| 2008/0137129 A1* | 6/2008 | Ferlitsch | H04N 1/00244 358/1.15 |
| 2010/0110464 A1* | 5/2010 | Kardamilas | H04N 1/00405 358/1.13 |

* cited by examiner

*Primary Examiner* — Quang N Vo
(74) *Attorney, Agent, or Firm* — Millen, White, Zelano & Branigan, P.C.; William Nixon

(57) ABSTRACT

A mobile device includes a scan privacy tool to allow edits and changes to a document image to remove or hide private information within a document. The scan privacy tool is enabled for jobs on a multi-functional printing (MFP) device and launches when a print job is run. The document is sent from a device or retrieved from memory storage. The document image displayed on a display and edit interface of the scan privacy tool. Changes are made to the document image using tools available through the scan privacy tool. The changes are applied to the document image. The modified image is saved and transmitted to an engine in the MFP device to complete the print job.

20 Claims, 13 Drawing Sheets

SCAN PRIVACY TOOL USING A MOBILE DEVICE FOR PRINTING OPERATIONS

This application is a continuation-in-part application of U.S. patent application Ser. No. 16/380,344, which is a continuation application of U.S. patent application Ser. No. 15/476,493, filed on Mar. 31, 2017, issued as U.S. Pat. No. 10,298,795.

FIELD OF THE INVENTION

The present invention relates to printing documents and using a scan privacy tool on a mobile device to perform actions on the scanned document to be printed at the multi-functional printer prior to printing the document.

DESCRIPTION OF THE RELATED ART

A user may print a document by sending it in an electronic form to a multi-functional printing (MFP) device. The document is created on a computing device. The computing device may store the document electronically before sending it over the network to the MFP device. Once sent, however, the user has no opportunity to revise or change the document before it is printed. This issue may be especially problematic if sensitive or confidential information is within the document. The user may not wish to overwrite or remove the information from the saved document but also does not wish to print a document with the information. To do so, the user would print the document, edit out the confidential information using correction fluid, paper, or other office supplies, and then reprint the document at the MFP device. A process such as this is time consuming, especially if many copies of the document need to be made.

SUMMARY OF THE INVENTION

A multi-functional printing (MFP) device is disclosed. The MFP device includes printer components to print an image file of a document. The MFP device also includes an engine to receive the document to generate the image file for the printer components and to suspend printing operations. The MFP device also includes a scan privacy tool. The scan privacy tool includes an imaging interface to store the image file from the engine during the suspended printing operations. The scan privacy tool also includes a display and edit interface to receive the image file from the imaging interface and to display the image file. The display and edit interface performs an action to modify the image file using a tool. The scan privacy tool also includes a scan privacy tool library to support the tool to modify the image file as displayed by the display and edit interface. The display and edit interface sends the modified image file to the imaging interface. The engine receives the modified image file from the imaging interface and provides the modified image file to the printer components.

A system for printing a document also is disclosed. The system includes a multi-functional printing (MFP) device to print the document using printer components. The system also includes a device connected to the MFP device. The document is created or stored on the device. The system also includes an engine within the MFP device to receive the document and generate an image file of the document compatible with the printer components. The system also includes a scan privacy tool to receive the image file from the engine and to modify the image file. The scan privacy tool performs an action to modify the image file using a tool. The modified image file is provided to the engine to complete printing operations.

A method of printing a document also is disclosed. The method includes receiving the document at a multi-functional printing (MFP) device. The method also includes generating an image file of the document. The image file is to be printed. The method also includes displaying the image file on a scan privacy tool. The method also includes selecting a tool supported by the scan privacy tool. The method also includes modifying the image file using the tool of the scan privacy tool. The method also includes saving the modified image file. The method also includes transmitting the modified image file to an engine of the MFP device.

Another multi-functional printing (MFP) device is disclosed. The MFP device includes a scanning component to generate an image file of a document. The MFP device also includes a privacy tool. The privacy tool includes an imaging interface for the scanning component to store the image file in a memory location. The privacy tool also includes a display and edit interface to receive the image file from the imaging interface and to display the image file. The display and edit interface performs an action to modify the image file. The privacy tool also includes a privacy tool library to support the action to modify the image file as received by the display and edit interface. The MFP device also includes an engine to receive the modified image file from the display and edit interface in order to process the modified image file.

A scan privacy tool for use with a multi-functional printing device also is disclosed. The scan privacy tool includes an imaging interface to receive an image file of a document and to store the image file. The scan privacy tool also includes a display and edit interface to receive and to display the image file. The scan privacy tool also includes a privacy tool library having at least one tool to support an action to modify the image file. The display and edit interface use the at least one tool to modify the image file.

A mobile device for intercepting and editing an image file received from a computing device in a printing system is further disclosed. The mobile device includes a receiving interface for retrieving and receiving an image file from a computing device, a scan privacy tool for editing the image file using a tool selected from a scan privacy tool library, and an output interface for outputting the image file after being modified to the printing system for printing. The scan privacy tool may be installed to the mobile device from the computing device or the like or a built-in component of the mobile device.

A mobile device for intercepting and editing an image file in a printing system also is disclosed. A database of the mobile device stores image files that are scheduled to be sent to the printing device for printing. The image files are either sent from a computing device via a network or captured by an image capture module of the mobile device. The mobile device further comprises a scan privacy tool that retrieves the image file from the database, displays the image file on a display and edit interface, and modifies the image file using a tool selected from a scan privacy tool library. The scan privacy tool library supports the tool to modify a portion of the image file, and stores the modified portion of the image file as a modification pattern paired to the portion of the image file before being modified, and applies a set of rules and the modification pattern to the image file during the modification process. The tool is a software component and the modified portion is made private by the scan privacy tool.

A method for modifying an image file of a document also is disclosed. The method includes displaying the image file on a display and edit interface of a scan privacy tool. The method also includes selecting a tool from a scan privacy tool library of the scan privacy tool. The method also includes modifying the image file using the scan privacy tool. The method also includes saving the modified image file. The method also includes transmitting the modified image file to an engine of a multi-functional printing device.

A method for modifying an image file of a document on a mobile device is further disclosed. The method includes retrieving the image file from a computing device via a network, displaying the image file on a display unit of the mobile device, enabling a scan privacy tool to edit the displayed image file on the mobile device, and transmitting the image file after modification to a printing device

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1A:
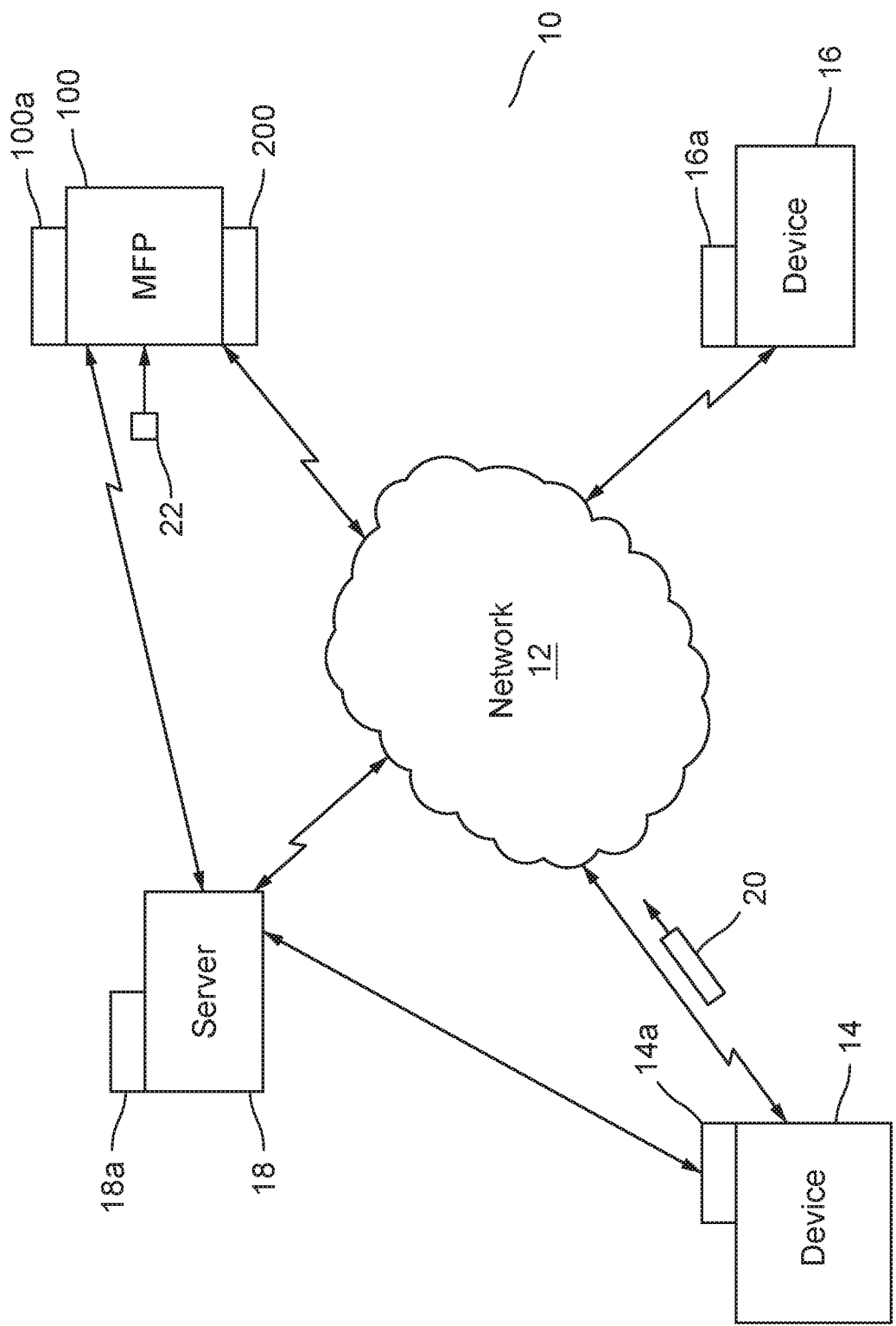
FIG. 1A illustrates a block diagram of a system having devices connected to a multi-functional printer over a network according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

Certain printing scenarios result in print jobs where documents are desired to be politically, culturally, or religiously sensitive, free of vulgar words, and not having confidential information. A document written several years or more may fit such a scenario. Confidential information such as social security numbers, intellectual property information and trade secrets, internal project codes, pricing information, and even contact phone numbers may be need to be removed from any printed documents based on the original. For example, an older evaluation form on an employee stored on a company network may include a social security number and a salary along with an address that should not be made public. If one wants to print the form, then this information should be removed or redacted.

In ideal situations, such sensitive documents are reviewed first, edited, and corrected using a document editing application before it is printed. When such a document editing application is not available, document corrections become a challenge. A possible "solution" may be to print the original document first and making corrections on the printed copy using markers, highlighters, post-it notes, or erasers. This process may be problematic when a large amount of printed text is being automatically printed as the materials would need to go through diligent proof reading to avoid the information from being printed as it is time consuming and physically laborious.

Such time consuming correction processes may be avoided with a capability to review and make corrections on a print job to an MFP device before it is actually put on paper. The result would be printed materials that can be safely distributed and used without disclosing the sensitive information. A scan privacy tool, as disclosed below, may be implemented with existing MFP devices. This makes it possible for offices, companies, and institutions to avoid problems with the disclosure of insensitive, personal, or confidential information.

The ability to cache pattern-rule pairs provides the feature of efficient updating and correction of document, especially those with a large number of pages. The pattern-rule pairs that the scan privacy tool can apply to subsequent pages being printed will save the user a lot of time from doing redundant searches for sensitive information. The scan privacy tool also may apply the effects or tools when the same page content re-appears in subsequent pages or even in subsequent printing or copying of the same document.

In some embodiments, the scan privacy tool is a scanner tool used after scanning a page or document. It may be a post-scan tool used to make corrections, markings, highlights, colorization, de-colorization, erasures, masks, blurs, and the like in conjunction with MFP scan, copy, and fax features. The scan privacy tool may act as an annotation tool that is focused specifically to partially obscure or remove confidential information as opposed to using notes, correction fluid, or computer programs. Thus, one does not need a computer or office supplies for modifying or hiding information as all of these capabilities are located at the scanner or MFP.

The scan privacy tool is a tool that may respond to these tasks. It is not an annotation software solution per se. The scan privacy tool provides the capability to erase or block-out confidential keywords, numbers, phrases, codes, or pictures as well as the ability to do simple yet needed and practical corrections on scanned pages or images. Hereinafter, use of the term "image" includes scanned pages and documents.

The disclosed scan privacy tool includes several features that provide benefits when using an MFP for scanning or reproduction of documents. One feature is an easily accessible proofreading service and tool located at the scanner or MFP engine. The scan privacy tool also improves the use of the MFP with a document reflective mat. The scan privacy tool software development kit and application program interfaces on top of the scanner firmware to expose the scanned image may lead to development of other applications and business models incorporated with the MFP.

In other embodiments, the scan privacy tool may be used in printing operations. It may be possible to process incoming print jobs, documents, image files, and other files through the scan privacy tool as used in a system. The scan privacy tool allows for proofreading, editing, correcting, and the like of documents coming to the printer from other devices within the system. For example, previously generated print jobs (PCL5, Postscript, XPS, PCLXL, and others), or JPG/TIFF/PNG or full document such as PDF, XPS, spreadsheet, or text document can be directly printed and processed at a printer through the scan privacy tool.

A workflow for use of the scan privacy tool within a system for printing operations may be as follows. The user can send the print jobs to the printer through a network supporting the system. Alternatively, the printer can select or upload those files from a USB dongle, network storage, cloud storage, and the like. The raster image process (RIP) firmware will parse, interpret, and render those files like a regular print job. Before the print jobs or documents are actually printed, saved, or transmitted, the printing/saving/transmission is suspended. The imaging interface of the scan privacy tool may receive or intercept the "document image" and sent it to the display and edit interface. The scan privacy tool may apply pattern-rule pairs, as disclosed below. The user can interact with the display and edit interface to perform and apply the tools and effects provided in the scan privacy tool library toolbox. Once all the changes are accepted or approved, the user selects "Done" or "Apply" to allow the display and edit interface to finalize the updated "document image." The document image is sent back to the imaging interface, which relays it to the engine firmware for printing, saving, or transmitting.

The following terminologies may be used as disclosed below:

A Page Description Language (PDL) is a type of programming language that describes the document or pages in a print job. Examples of PDLs include Printer Command Language (PCL) 5, PCLXL or PCL 6, and PostScript. Portable Document Format (PDF) and XML Paper Specification (XPS) also belong to this group. Image formats such as JPG or TIFF, which also may be printed, may be special cases that are handled by the PDL.

A Graphics Rendering Component is an internal component in RIP firmware that translates the PDL commands or date into binary data that the MFP engine understands. This is similar to machine language to which programming languages are translated for computing devices to understand. The binary data is understood by the hardware in the MFP and converted into actual drawings or pixels on the paper.

A Software Development Kit (SDK) is a library for adding and enabling features in a software or firmware package. It also is a library to allow for development of applications on top of the software or firmware package.

An Application Programming Interface (API) is a set of interface functions that may be programmatically accessed at the MFP engine for interacting and cooperating with the firmware at run-time or during the use of the display and edit interface.

A scanned document image refers to the raster or binary image representation of the scanned document that the MFP has translated from the document on the scanner flatbed or document processor tray.

An original source pattern is a part of the scanned document image that the user is interested in modifying, correcting, or editing using the scan privacy tool. The part may be like a rectangular or shaped area or, alternatively, an irregular shaped area in the document.

A modification pattern is a raster image of the modified source pattern that is created after applying the scan privacy tool.

Pattern-Rule Pairs refer to a mapping of the original source pattern and rules that would be applied to the source pattern for editing, updating, modifying, or correcting the original source image, or scanned document image. The source pattern can be a raster or binary image of a plain text that can be searched in the scanned document image. The rules may be a list of modification patterns or at least one library tool that can be applied to the source pattern.

FIG. 1A illustrates a block diagram of a system 10 having devices connected to a multi-functional printer 100 over a network 12 according to the disclosed embodiments. System 10 may be applicable to a work, business, or home environment where one or more users send documents to a printer from devices connected thereto. System 10 shows devices 14 and 16 connected to MFP 100 via network 12. Network 12 may be a local area network (LAN) that uses addresses to identify the different components within system 10. In other embodiments, device 14 or 16 may be connected directly to MFP 100, either in a wireless or wired configuration. System 100 also includes one or more servers 18. As can be appreciated, other components may be connected to network 12 to send and receive information within system 10.

A user may create a document using device 14. For example, the user may type a paper using a word processor application. The user stores the document at device 14. The user also wishes to print the document for review. The user sends the document, as electronic document 20, to MFP 100. The user may send electronic document 20 via network 12. Each component within system 10 may have an internet protocol (IP) address that uniquely identifies it within system 10 so that it may receive information over network 12. Thus, device 14 includes IP address 14*a*, device 16 includes IP address 16*a*, server 18 includes IP address 18*a*, and MFP 100 includes IP address 100*a*. For a print job, device 14 sends electronic document 20 to MFP 100 using its IP address 100*a*. Alternatively, components within system 100 may have a unique identification number that is not an IP address. Thus, use of the term "address" in the present specification refers to a unique identifier or IP address a specific component attached to network 12.

MFP 100 prints out electronic document 20. Before printing, however, scan privacy tool 200 may intercept electronic document 20. The document is displayed by scan privacy tool 200 so that the user may make further corrections, edits, and the like on the document before printing. For example, the user may remove confidential information from the document so that the information is not printed. In another example, the user may correct a mistake noticed after sending electronic document 20 to MFP 100. After the changes are made, the finalized document may be printed or stored at server 18 or back at device 14.

In other embodiments, the user may create the document on device 14 but then save it to removable storage device 22. Removable storage device 22 is taken to MFP 100 and inserted into the appropriate port. The document is retrieved from the storage but needs corrections or edits, such as to remove confidential information. The disclosed embodiments use scan privacy tool 200 to interrupt the printing process and display the document for editing, correcting, or removing information. Thus, it is not required that electronic document 20 is sent over network 12 to MFP 100. Electronic document 20 also may be retrieved from server 18, or from cloud storage connected to network 12. After electronic document 20 is received at MFP 100, scan privacy tool 200 may intercept it for additional processing before printing. These features are disclosed in greater detail below.

Figure 1B:
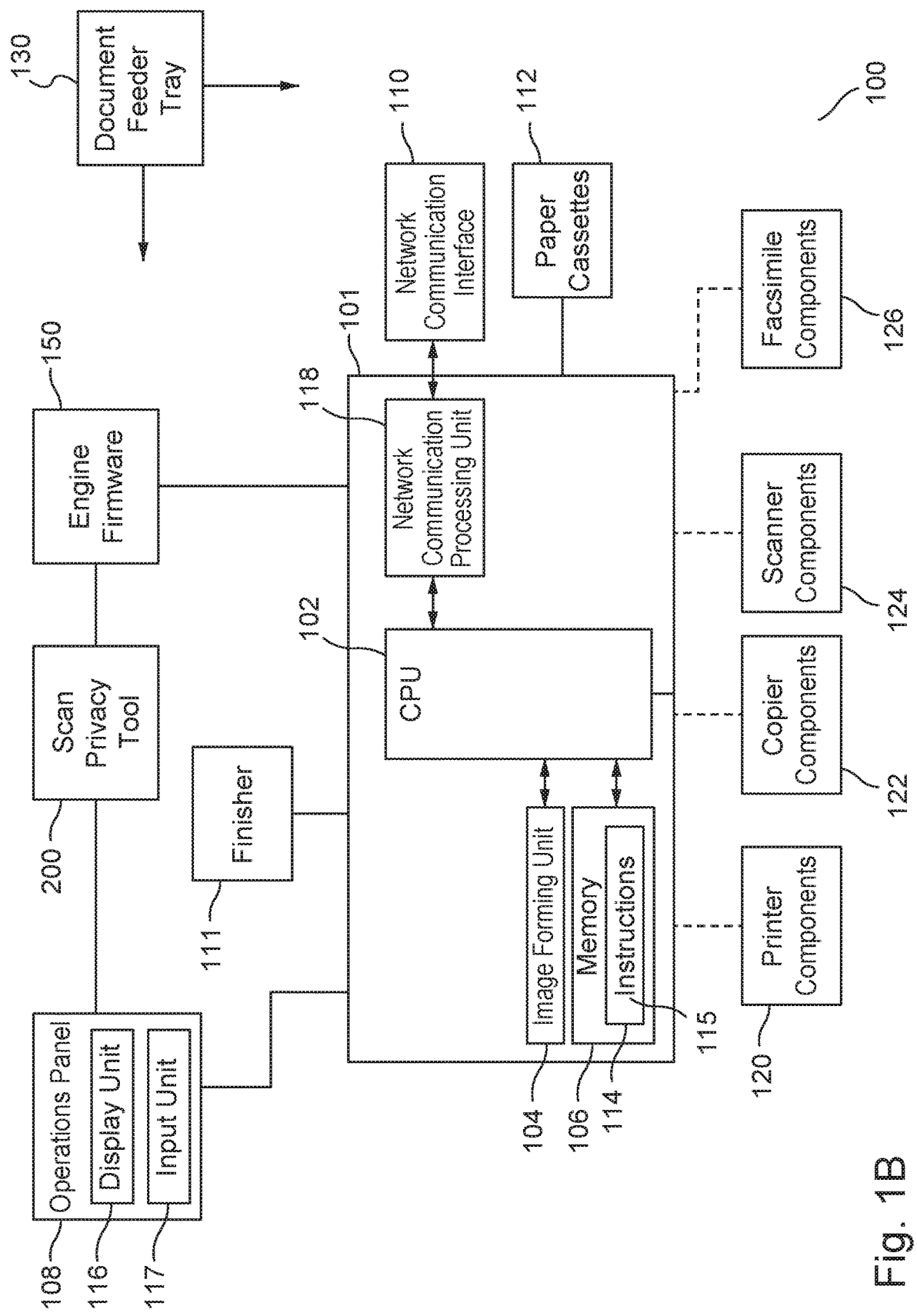
FIG. 1B illustrates a block diagram of a multi-functional printer having a scan privacy tool according to the disclosed embodiments.

FIG. 1B depicts a block diagram of a multi-functional printer (MFP) 100 having a scan privacy tool 200 according to the disclosed embodiments. The architecture shown in FIG. 1 may apply to any multi-functional printer or image forming apparatus that scans documents to perform other functions, such as printing, storing, copying, and the like.

MFP 100 includes a computing platform 101 that performs operations to support these functions. Computing platform 101 includes a computer processing unit (CPU) 102, an image forming unit 104, a memory unit 106, and a network communication interface 110. Other components may be included but are not shown for brevity. MFP 100, using computing platform 101, may be configured to perform various operations, such as scanning, copying, printing, receiving or sending a facsimile, or document processing. As such, MFP 100 may be a printing device or a multi-function peripheral including a scanner, and one or more functions of a copier, a facsimile device, and a printer. To provide these functions, MFP 100 includes printer components 120 to perform printing operations, copier components 122 to perform copying operations, scanner components 124 to perform scanning operations, and facsimile components 126 to receive and send facsimile documents. CPU 102 may issue instructions to these components to perform the desired operations.

MFP 100 also includes a finisher 111 and one or more paper cassettes 112. Finisher 111 includes rotatable downstream rollers to move papers with an image formed surface after the desired operation to a tray. Finisher 111 also may perform additional actions, such as sorting the finished papers, binding sheets of papers with staples, doubling, creasing, punching holes, folding, and the like. Paper cassettes 112 supply paper to image the various components 120, 122, 124, and 126 to create the image formed surfaces on the papers. Paper cassettes 112 may include papers having various sizes, colors, composition, and the like. Paper cassettes 112 may be removed to refill as needed.

Document processor input feeder tray 130 may be the physical components of MFP 100 to receive papers and documents to be processed. A document is placed on or in document processor input feeder tray 130, which moves the document to other components within MFP 100. The movement of the document from document processor input feeder tray 130 may be controlled by the instructions input by the user. For example, the document may move to a scanner flatbed 210, as disclosed below, for scanning operations. Thus, document processor input feeder tray 130 provides the document to scanner components 120. As shown in FIG. 1, document processor input feeder tray 130 may interact with engine firmware 150 to perform the desired operations.

Memory unit 106 includes memory storage locations 114 to store instructions 115. Instructions 115 are executable on CPU 102 or other processors associated with MFP 100, such as any processors within components 120, 122, 124, or 126. Memory unit 106 also may store information for various programs and applications, as well as data specific to MFP 100. For example, a storage location 114 may include data for running an operating system executed by computing platform 101 to support the components within MFP 100.

Memory unit 106 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 106 also includes any combination of readable or writable volatile memories or non-volatile memories, along with other possible memory devices.

Computing platform 101 may host one or more processors, such as CPU 102. These processors are capable of executing instructions 115 stored at one or more storage locations 114. By executing these instructions, the processors cause MFP 100 to perform various operations. The processors also may incorporate processing units for specific purposes, such as application-specific integrated circuits (ASICs) and field programmable gate arrays (FPGAs). Other processors may be included for executing operations particular to components 120, 122, 124, and 126. In other words, the particular processors cause MFP 100 to act as a printer, copier, scanner, and a facsimile device. One processor may be a raster image processor for use with printing components 120.

MFP 100 also includes an operations panel 108, which may be connected to computing platform 101. Operations panel 108 may include a display unit 116 and an input unit 117 for facilitating interaction with a user to provide commands to MFP 100. Display unit 116 may be any electronic video display, such as a liquid crystal display (LCD). Input unit 117 may include any combination of devices that allow users to input information into operations panel 108, such as buttons, a touch screen, a keyboard or keypad, switches, dials, and the like. Preferably, input unit 117 includes a touch-screen digitizer overlaid onto display unit 116 that senses touch to receive inputs from the user. By this manner, the user interacts with display unit 116. Scan privacy tool 200 also is connected to operations panel 108, as disclosed in greater below.

MFP 100 also includes network communication processing unit 118. Network communication processing unit 118 may establish a network communication, such as a wireless or wired connection with one or more other image forming apparatuses and a server in an image forming system. CPU 102 may instruct network communication processing unit 118 to transmit or retrieve information over a network using network communication interface 110. As data is received at computing platform 101 over a network, network communication processing unit 118 decodes the incoming packets and delivers them to CPU 102. CPU 102 may act accordingly by causing operations to occur on MFP 100. CPU 102 also may retrieve information stored in memory unit 106, such as settings for MFP 100.

MFP 100 also includes engine firmware 150. Engine firmware 150 may be a combination of hardware and software components that act accordingly to accomplish a task. For example, engine firmware 150 is comprised of components and software to print a document. It may receive instructions from computing platform 101 after user input via operations panel 108. Alternatively, engine firmware 150 may receive instructions from operations panel 108 via scan privacy tool 200.

Engine firmware 150 manages and operates the low-level mechanism of the MFP engine, such as hardware components that actuate placement of toner onto paper. Engine firmware 150 may manage and coordinate the half-toner, toner cartridges, rollers, schedulers, storage, input/output operations, and the like. The raster image processor (RIP) firmware that interprets the page description languages (PDLs) would transmit and send instructions down to printer components 120 may be included in engine firmware 150 for actual rendering of an image and application of the toner onto paper during operations on MFP 100. Embodiments of engine firmware 150 also are disclosed in a greater detail below.

Figure 2A:
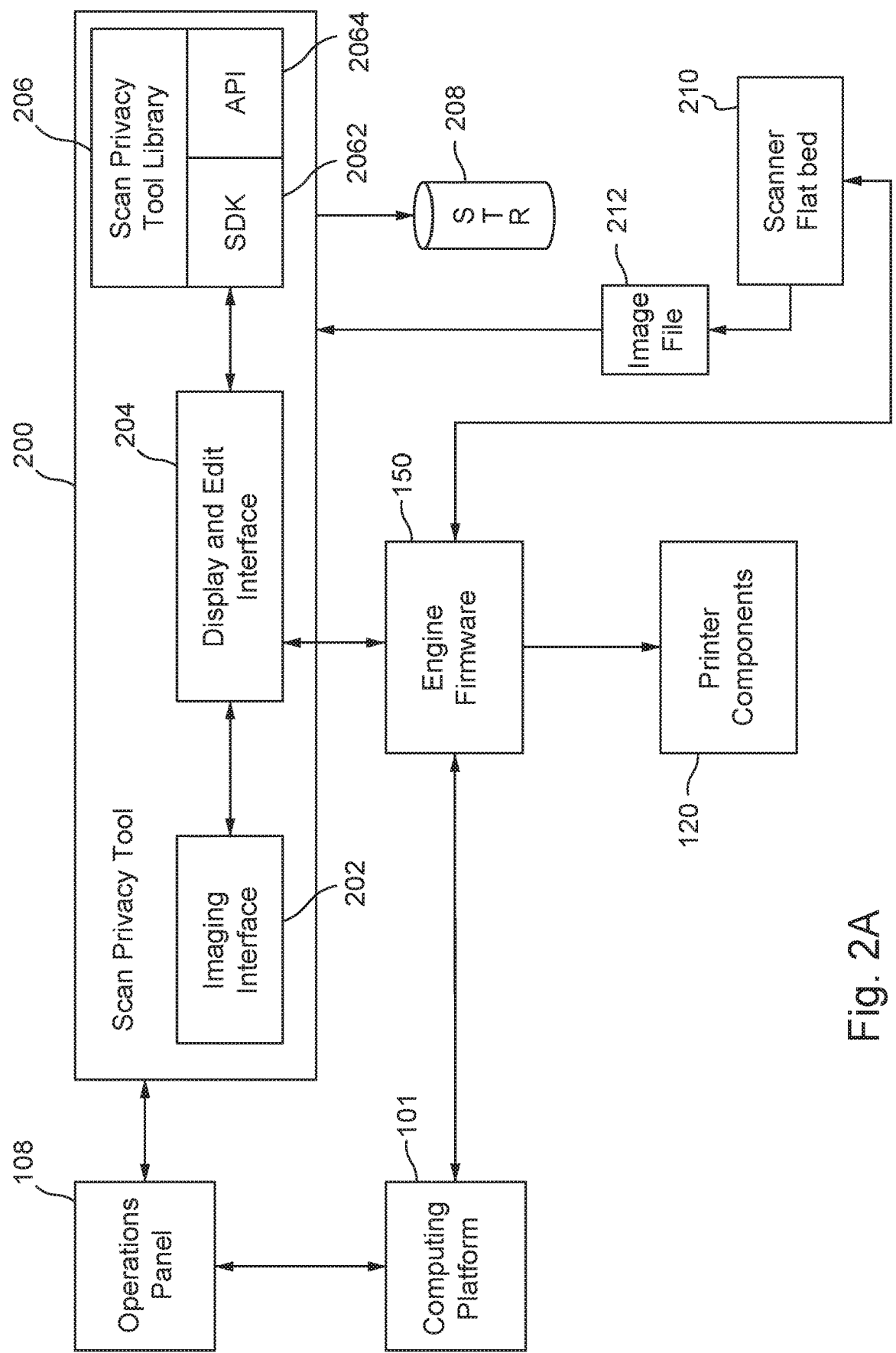
FIG. 2A illustrates a block diagram of components of the scan privacy tool with components of the multi-functional printer according to the disclosed embodiments.
Figure 2B:
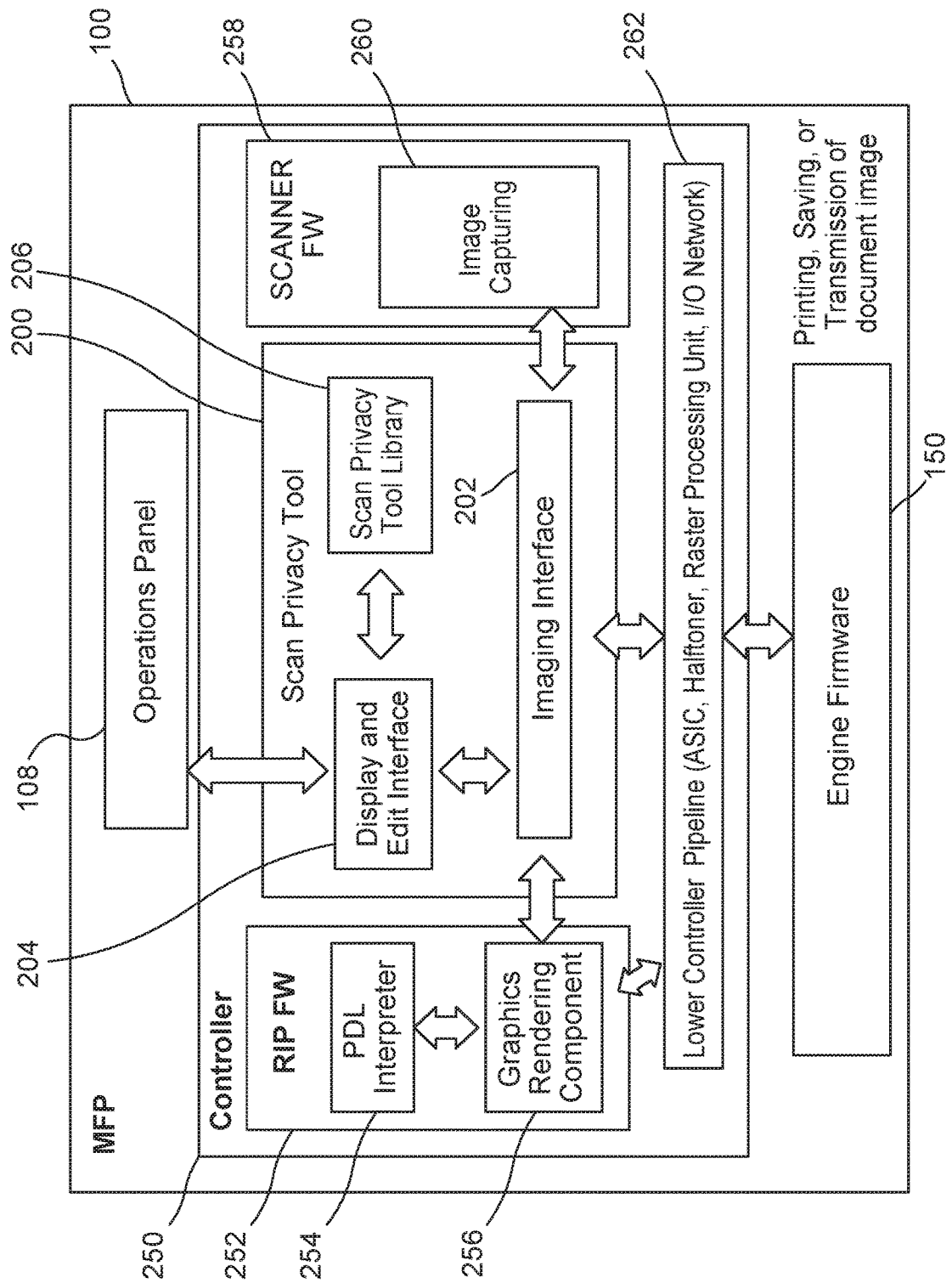
FIG. 2B illustrates another block diagram of components of the scan privacy tool with components of the multi-functional printer according to the disclosed embodiments.

FIG. 2A and FIG. 2B depict block diagrams of components of scan privacy tool 200 integrated inside MFP 100 according to the disclosed embodiments. FIG. 2A shows scan privacy tool 200 operably connected to various components of MFP 100. Scan privacy tool 200 may be integrated into MFP 100, or may be a separate hardware component connected to MFP 100. Alternatively, scan privacy tool 200 may be a mobile device that is connected to MFP 100, either via a wire or other physical connection or wirelessly to network communication interface 110. These embodiments are disclosed in greater detail below. A mobile device embodied with a scan privacy tool is further disclosed in FIG. 9.

Scan privacy tool 200 may include three components. Imaging interface 202 provides a scanned document image 212 for displaying on display and edit interface 204. Display and edit interface 204 may act as an interactive interface for performing proofreading tasks on the scanned document image 212. Scan privacy tool library 206 enables the functionalities, capabilities, and imaging routines for making the correction, cleaning, and other proofreading tasks on scanned document image 212. Once all edits are made, the updated, modified, or corrected document image 212 is sent to the applicable components by engine firmware 150 for actual saving, copying, printing, faxing, or other actions. Printer components 120 are shown for illustrative purposes in any examples provided below. Engine firmware 150 receives the revised document image from scan privacy tool 200 to accomplish any tasks.

Imaging interface 202 may be an update to current scanner firmware (as part of engine firmware 150), which is the component that scans the physical page from scanner flatbed 210 as part of scanner components 124. Alternatively, scanned document image 212 may be captured using document processor feeder. A scanner firmware update will add support for interfacing with the other components, such as scan privacy tool library 206 and display and edit interface 204 of scan privacy tool 200.

In some embodiments, imaging interface 202 is a module or component that intercepts a scanned document or document image from the current scanner pipeline. The scanner firmware that manages scanner components 124 may include code or a component to interact with imaging interface 202. Normally, the scanner firmware would scan the document or page from scanner flatbed 210, apply the selected effects from operations panel 108, and send document image file 212 to engine firmware 150 for printing, saving, transmission, and the like. Using scan privacy tool 200, imaging interface 202 receives document image file 212 to edit or modify using display and edit interface 204, as disclosed below.

Image interface 202 keeps the editable, rasterized image file in a memory or storage, either within scan privacy tool 200 or external storage 208. As disclosed below, "storage 208" may refer to internal or external memory storage for scan privacy tool 200. Image interface 202 may share the image file with display and edit interface 204 for presenting it to a user for performing the edits. Once all the editing is completed, imaging interface 202 gets back the updated, corrected, or modified image for saving, copying, printing, transmitting, and the like. In other words, after the user finalizes the "corrected document image," this new image file is sent back to imaging interface 202. Imaging interface 202 may send the new image file to engine firmware 150 for further operations within MFP 100.

Scan privacy tool library 206 allows for the image processing of scanned document image 212 through programming interfaces to imaging interface 202. This component of scan privacy tool 200 includes software development kit (SDK) 2062 and application programming interface (API) 2064 that provide functions to support capabilities within scan privacy tool library 206. Scan privacy tool library 206 provides the interface functions to allow querying for location, color, and other similar page content properties for use in the manipulation, correction, and other proofreading effects. It gets reference to document image file 212. Scan privacy tool library 206 also supports interface functions to edit any items or objects in the scanned pages of scanned document image 212. Tools include those to allow for erasure, masking, overwriting, blurring, highlighting, and the like of the selected page items or objects. Other tools include those to add pre-defined patterns such as hatch patterns, colors, objects, and the like on top of or over page items or objects.

Scan privacy tool library 206 includes tools to provide the capabilities to a user of MFP 100 for editing scanned document image 212. The tools may be stored as software components within scan privacy tool library 206 and executed when selected via API 2064 or from display and edit interface 204. The tools may include:

Erase—remove the pattern or object;
Blur-out—pixelate or cause the pattern to be blurred, unreadable, or unrecognizable;
Black-out—overlay a rectangular black box around the pattern or object;
Mask-out—overlay a pre-defined pattern, such as a hatch pattern, on top of the pattern or object;
Highlight—overlay a transparent color on top of the pattern or object;
Encircle—enclose the pattern or object with a circle or elliptical shape;
Rectangular—enclose the pattern or object in a rectangular shape;
Check—overlay the pattern or object with a check-mark;
Cross-out—overlay the pattern or object with a cross-mark or a big X character;
Colorize—change the color of the pattern or object to a user-selected color;

De-colorize—remove color and leave behind the outline of the pattern or object;

Blend—blend a selected pattern or image on top of pattern or object; and

Hide—overlay an opaque pattern, hatch pattern, or image on top of a pattern or object.

The above list may be subject to additional capabilities by tools within scan privacy tool library 206.

Display and edit interface 204 is a component in scan privacy tool 200 that allows for the editing, correcting, and proofreading of scanned document image 212 to actually occur. It acts as the user interface to interact with scanner components 124 to perform the scan privacy tool tasks. Display and edit interface 204 may include a display interface that is a digitized display, such as a touch-screen display, a pen-enabled display, or a stylus-enabled display. Display and edit interface 204 also captures user actions and input. Display and edit interface 204 also may include non-interactive display devices that support this component through the use of motion sensors or control buttons. A user will be able to access display and edit interface 204 to use a finger, digitized pen or stylus, or gestures when using motion sensors to apply the library tools disclosed above supported by scan privacy tool library 206.

In some embodiments, display and edit interface 204 is kind of a "client" of scan privacy tool library 206. Display and edit interface 204 makes use of API 2064 (or APIs) exposed by the scanner firmware to apply the effects to document image file 212. SDK 2062 is provided so that other applications can be developed to take advantage of the tools available in scan privacy tool library 206 to perform effects on the document image. For example, plug-ins may be developed, installed, and access through the printer panel for the manipulation of the document image.

As shown in FIG. 2A, scan privacy tool 200 may interact with other components of MFP 100 as well as external devices. Instructions from operations panel 108 may be received to invoke the scan privacy functions support by tool 200. Operations panel 108 also may support display and edit interface 204, as disclosed below. Scanned document image 212 is received as an electronic document from scanner flatbed 210, which is a piece of hardware within MFP 100. Scan privacy tool 200 provides any finished document to engine firmware 150 for additional actions, such as printing, copying, storing, and the like. A detachable storage 208 also may support scan privacy tool 200, as disclosed below. In some embodiments, storage 208 may be within an external device that supports scan privacy tool 200.

FIG. 2B depicts another block diagram of components of scan privacy tool 200 with components of the MFP 100 according to the disclosed embodiments. FIG. 2A discloses that engine firmware 150 may encompass software functionalities like print job parsing and interpretation, graphics rendering, and document image creation. Thus, raster image processing (RIP) firmware and scan firmware may be included or part of engine firmware 150, as shown in FIG. 2A.

FIG. 2B, however, depicts a different architecture for MFP 100 and scan privacy tool 200. In this configuration, MFP 100 includes a controller 250 that includes RIP firmware 252 and scanner firmware 258. Engine firmware 150 is below controller 250 in MFP 100. Preferably, controller 250 is a main controller board that contains RIP firmware 252 and scanner firmware 258. These components are disclosed in greater detail below.

RIP firmware 252 includes PDL interpreter 254 and graphics rendering component 256. PDL interpreter 254 is the parser and translator of PDL commands, such as PCL5, PCLXL, XPS, PDF, PostScript, and the like, to graphics orders that graphics rendering component 256 can understand. The graphics orders are lower-level commands, similar to assembly programming language or computing device machine language. Graphics rendering component 256 executes the graphic orders and translates them to shapes, colors, figures, lines, and other markings to construct the logical representation of the pages of the document, shown as document image 212 above.

Scanner firmware 258 includes image capturing component 260. Image capturing component 260 allows for the capture of document image 212 from the physical pages of the document and translates them directly to a logical representation of the page or pages. This representation may be like a photograph softcopy of the physical page, or pages, of the document. Referring back to FIG. 2A, scanner flatbed 210 may be used. A print job within system 10 may be sent from device 14 or 16 and may not need scanner firmware 258 as the document is already in electronic form, as one from a word processing application.

Scan privacy tool 200 operates as disclosed above. As shown in FIG. 2B, imaging interface 202 interacts with RIP firmware 252 and scanner firmware 258 as well as lower controller. In this configuration, however, imaging interface 202 downloads the updated document image 212 to lower controller pipeline 262 for further processing such as halftoning and color conversion. Lower controller pipeline interacts with the rest of the hardware components for marking the physical paper.

Engine firmware 150 should not change under this configuration. Engine firmware 150 still manages and operates the low-level mechanisms of MFP 100, such as hardware components like drums, rollers, toner cartridges, storage, and input/output operations. Engine firmware 150 may control and manage signaling of these hardware components, including temperature control, speed, and other electrical signals.

In MFP 100 shown in FIG. 2B, scan privacy tool 200 is a shared component in that RIP firmware 252 and scanner firmware 258 interact with the tool to handle intercepted or suspended print jobs within system 10. Document image 212 will be suspended or intercepted by imaging interface 202, which knows where to retrieve the source document image and can determine where to save the updated or corrected document image 212. RIP firmware 252 and scanner firmware 258 notifies imaging interface 202 of the availability of document image 212.

When scan privacy tool 200 is turned "ON," then document image 212 is intercepted for review or edit before it is printed, saved, or transmitted. If scan privacy tool 200 is turned "OFF" for print or scan jobs, RIP firmware 252 will operate as usual. Document image 212 is sent directly to engine firmware 150. RIP firmware 252 outputs to lower controller pipeline 262 and does not interact with scan privacy tool 200.

Figure 3:
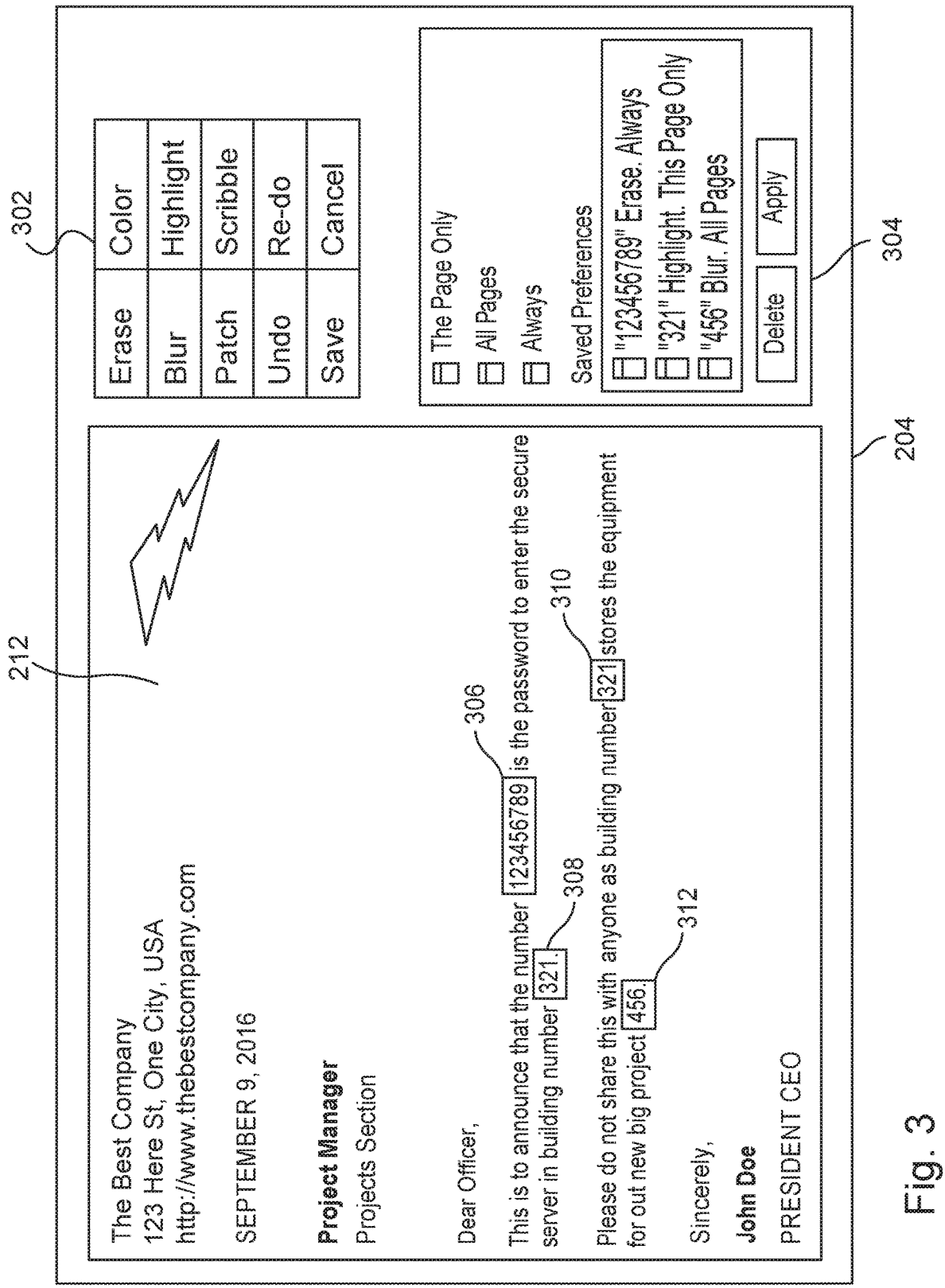
FIG. 3 illustrates an example of a display and edit interface according to the disclosed embodiments.

FIG. 3 depicts an example of a display and edit interface 204 according to the disclosed embodiments. Display and edit interface 204 may be integrated into the scanner system of MFP 100, such as on operations panel 108 or on the document reflective mat, as disclosed below. It also may be supported by a connected device, such as a laptop, tablet, smartphone, or computer. A user interacts with display and edit user interface 204 to make corrections or edits on scanned document image 212, displayed within the interface. The term "scanned document image" refers to an electronic version of a document created on device 14 or 16.

The document may be sent over network 12 to MFP 100 for printing. MFP 100 converts the document into an electronic version of the document suitable for printing, such as using a RIP to render the information on the document compatible with engine firmware 150. Thus, although the term may represent documents that are scanned, it also represents documents received at MFP 100 or retrieved by MFP 100 for printing, copying, saving, and the like.

Display and edit interface 204 includes display and edit toolbox 302. Toolbox 302 includes buttons corresponding to the tools available within scan privacy tool library 206. The user may select what actions to use for applying the corrections or edits on scanned document image 212. The selection of one of the buttons within toolbox 302 invokes the functionality associated with the appropriate tool. The user then applies the tool to the text or graphics within scanned document image 212. Toolbox 302 must be present for all types of implementation or form factors of display and edit interface 204. As shown in FIG. 3, some embodiments include toolbox 302 with scanned document image 212.

In one example, the user wishes to erase one or more items within scanned document image 212. Toolbox 302 includes an erase button on display and edit interface 204. The user may select the erase button within toolbox 302 and use the interactive interface, which can be a touch screen display, to select the word, text, graphic, and the like to erase. The user may use a finger, a stylus, or a digital pen to identify the items to erase. In this example, the user applies pressure to the touch screen to indicate the items.

Further to the example, scanned document image may include private information 306, 308, 310, and 312. Private information in this example is text, or, more specifically, numbers. Private information 306 may include a password, while private information 308, 310 and 312 include locations and project information. The user may not wish such information to be reproduced or stored in an electronic format. Other information may be deemed private within scanned document image 212, such as names, address, date, and the like.

The user indicates private information 306-312 for erasure on display and edit interface 204. Referring to FIG. 3, the pixels of scanned document image 212 corresponding to the locations shown for the private information would be changed to reflect the erased text using the erase tool within scan privacy tool library. Alternatively, other actions may be taken using display and edit interface 204, such as blurring the private information or scribbling over it by selecting the appropriate button within toolbox 302.

Once the document has been changed or edited, pattern rule box 304 may be used to indicate whether the changes are to be applied to subsequent pages or documents. A pattern-rule pair indicated using pattern rule box 304 may be saved to apply similar patterns in the page or for the rest of the pages in scanned document image 212. As shown, pattern rule box 304 includes check boxes for applying the changes or edits for similar patterns on this page only, all pages, or always.

Referring to the above example, use of pattern rule box 304 may result in identifying private information 310 that has the same numbers as private information 308. Display and edit interface 204 would identify the similar private information and erase it. This may save time and reduce proofreading errors in large documents. This process is disclosed in greater detail below. In another example, the user checks the "Always" box in pattern rule box 304 to save and apply the pattern-rule pair to future scanned jobs. By default, the pair will be checked and selected in the user interface, unless the user un-selects the checkbox. Thus, the user can identify the password of private information 306 to always be erased in documents processed by MFP 100. This function alleviates the need to stop and erase the information on every page or in every document.

Display and edit interface 204 may be invoked using a button that launches scan privacy tool 200. In some embodiments, the feature will be a selectable option on operations panel 108 of MFP 100, such as copy, send, fax, store, and the like. To update, modify, or make corrections on scanned document image 212 shown by display and edit interface 204, the user may interact with an interactive front panel of operations panel 108.

Alternatively, scan privacy tool 200 may be an application executing in a mobile or external device connected to MFP 100. Touch-screen devices, such as tablets, computers, laptops, smartphones, and the like are connected to MFP 100, either using a wired or wireless connection. The device stores and executes the application that supports display and edit interface 204. With regard to a wireless connection, MFP 100 may use network communication interface 110 to exchange data using a known protocol and platform, such as Bluetooth™, WiFi, cellular, and the like. For the wired connection, the device hosting the application for scan privacy tool 200 may connect to MFP 100 using a USB connection and the like.

In some embodiments, the document will be scanned to generate scanned document image 212 in MFP 100. Scanned document image 212 will be viewable and editable in display and edit interface 204 displayed on the external device. The user may make edits, modification, or changes as disclosed above. For example, the user may select the erase button in toolbox 302 to erase private information within scanned document image 212. The user then selects the save button within toolbox 302 to finish edits in the document. The saved electronic document is transmitted to MFP 100 for further processing, such as printing, copying, storing, and the like.

Figure 4:
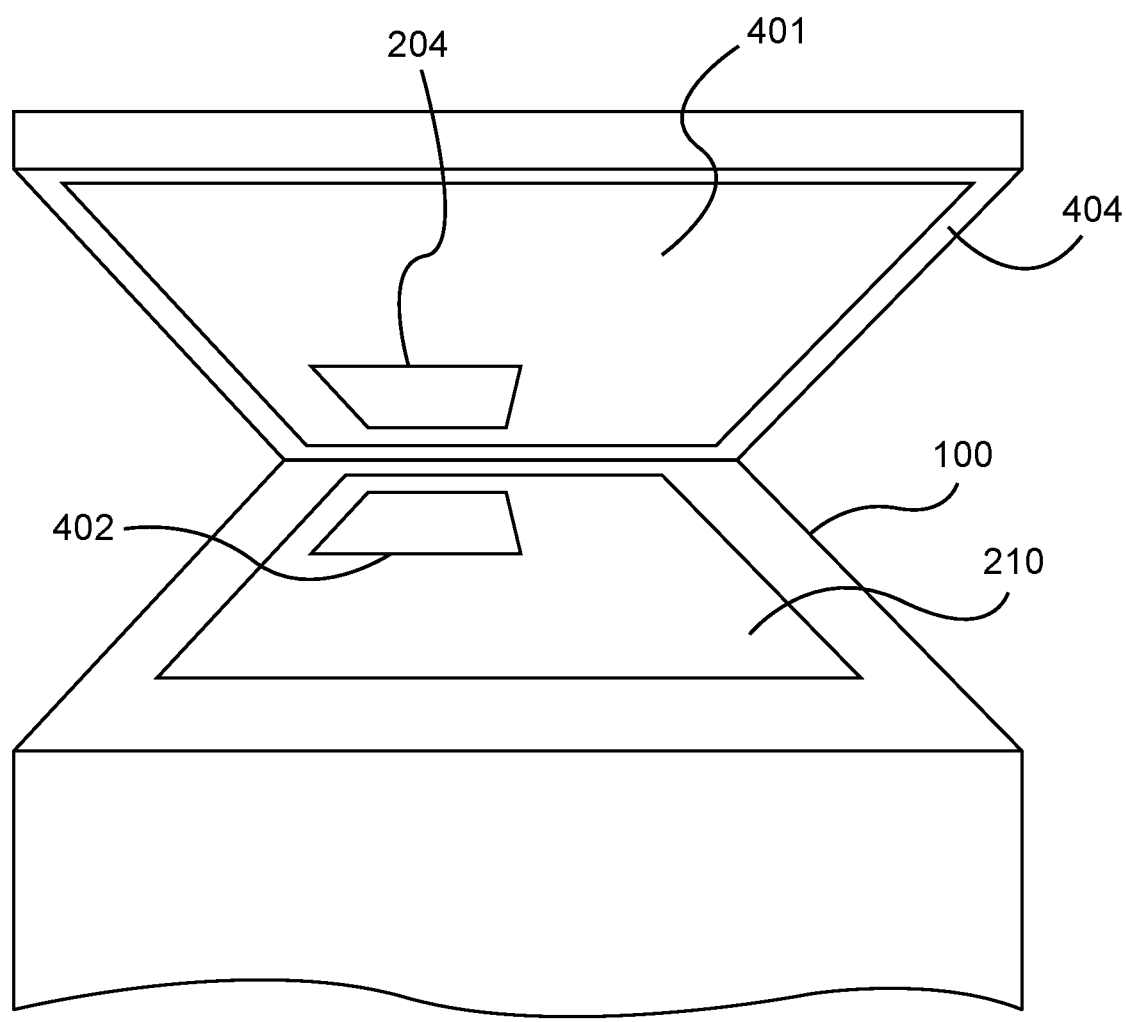
FIG. 4 illustrates another example of a display and edit interface used with a multi-functional printer according to the disclosed embodiments.

FIG. 4 depicts another example of a display and edit interface 204 used with MFP 100 according to the disclosed embodiments. This configuration of scan privacy tool 200 includes display and edit interface 204 being located on document reflective mat 401. Document reflective mat 401 may work with scanner cover 404 to press document 402 onto scanner flatbed 210. In some embodiments, document reflective mat 401 comprises a touch-screen display.

Because display and edit interface 204 is on the scanner cover or document reflective mat 401, it may not be applicable in all use cases, such as when document feeder tray 130 is used to receive document 402. Scanner cover 404 needs to be raised and opened to gain access to display and edit interface 204. This may not be practical when using document processor input feeder tray 130.

Solutions to using display and edit interface 204 on document reflective mat 401 include enabling the interface only when scanning is done using scanner flatbed 210. If document processor input feeder tray 130 is used, then scan privacy tool 200 is disabled or unavailable. Alternatively, the user may use scan privacy tool 200 in operations panel 108 such that display and edit interface 204 is displayed there as well.

Another solution may be to scan all document sheets from document processor input feeder tray 130. This process then saves all the scanned document images to storage 208. Storage 208, as shown in FIG. 2, may be attached or connected to MFP 100 and scan privacy tool 200. Storage 208 makes the saved document images available to display and edit interface 204 after all pages or documents are scanned. Preferably, storage 208 is external to MFP 100, such as a USB flash drive, so as to not hinder the printer engine, or engine firmware 150, from processing regular jobs. Further, this capability depends on sufficient free space in the memory of storage 208. Edits, modifications, and changes may be made from the first saved document image until the last page.

One also may consider other configurations for display and edit interface 204, such as a tablet or mobile device with a touch screen display. As disclosed above, an application is executed on the external device. The device includes an integrated scan privacy tool 200 along with SDK 2062 and API 2061 to receive scanned document image 212 from MFP 100. The user edits, modifies, and changes private information within the document image using display and edit interface 204 supported by the applicable touch-screen or display device. The modified document images are sent back to MFP 100 for subsequent operations, such as copying, printing, faxing, and the like.

In other embodiments, motion sensors, a mouse, or control buttons may be installed around display unit 116 of operations panel 108 that is not a touch-screen. These components support gestures and the tracking of indicators, such as a finger, hand, pointer, pen, and the like, to manipulate the document images or objects shown on display unit 116. Display and edit interface 204 also may include a virtual reality or augmented reality interface through a smart phone or similar devices. Display and edit interface 204 may be viewable in virtual reality or augmented reality. Gestures and hand motions may edit the document images. Alternatively, controls within the virtual reality environment through the applicable gear device may be used.

Figure 5A:
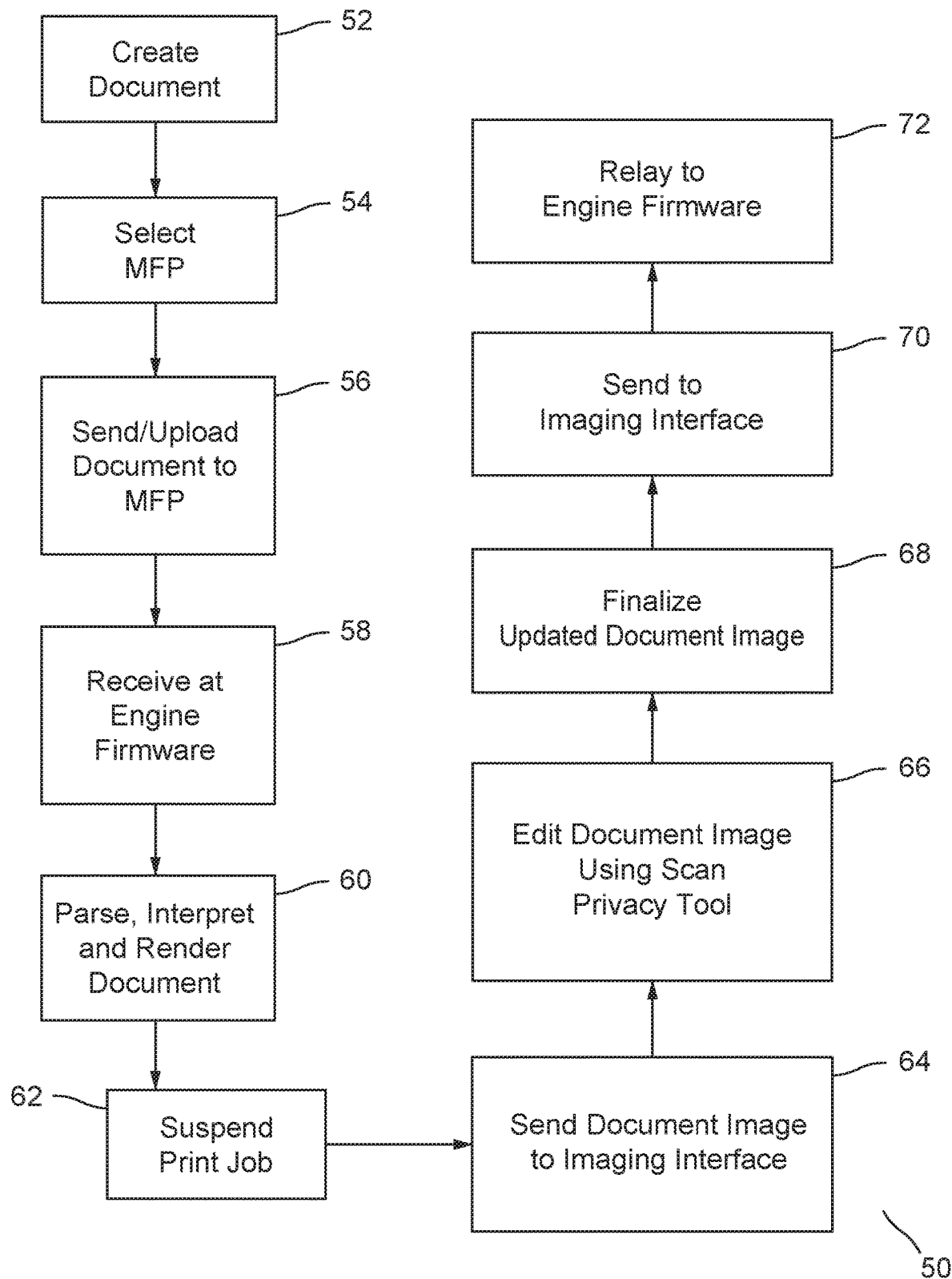
FIG. 5A illustrates a flowchart for sending a document to a multi-functional printer having a scan privacy tool according to the disclosed embodiments.

FIG. 5A depicts a flowchart 50 for sending a document to MFP 100 having a scan privacy tool 200 according to the disclosed embodiments. The disclosure for flowchart 50 may include reference to components recited above with regards to FIGS. 1-4 for illustrative purposes. The embodiments disclosed by FIG. 5A, however, are not limited to the components shown in those figures.

Step 52 executes by creating document 402 at device 14 or 16. For simplicity, only device 14 is disclosed below, but any device connected to network 12 may create a document. In some embodiments, the document may be scanned or an image captured by device 14. Further, document 402 may be in electronic form, as opposed to a physical document, as shown by document 20 in FIG. 1A.

Step 54 executes by selecting MFP 100 to print document 402. One may select MFP 100 to perform other operations as well, such as save, copy, further transmit by facsimile, and the like. Step 56 executes by sending or uploading document 402 to MFP 100. As disclosed above, device 14 sends document 20 to MFP 100. The document also may be provided with a device, such as a flash drive or mobile device, attached to MFP 100. Step 56 also may include instructing MFP 100 to retrieve a document from server 18 or other memory location on network 12. MFP 100 only needs to receive the document to process.

Step 58 executes by receiving document 402 or 20 at engine firmware 150. Preferably, MFP 100 instructs engine firmware 150 to print the document. Step 60 executes by using engine firmware 150, acting as RIP firmware, to parse, interpret, or render the received document into document image 212, which is suitable for printing. Before the print job occurs, however, step 62 executes by suspending the print job within MFP 100.

Step 64 executes by sending document image 212 to imaging interface 202 of scan privacy tool 200. After the print job is suspended, document image 212 is provided to scan privacy tool 200. It goes first to imaging interface 202. This process is disclosed in greater detail below. Step 66 executes by editing document image 212 using scan privacy tool 200. Specifically, one may use display and edit interface 204 to edit information within document image 212. For example, scan privacy tool 200 may apply pattern-rule pairs to the document. The user may interact with display and edit interface 204 to perform and apply the tools and effects provided in the toolbox for scan privacy tool library 206. Again, these processes are disclosed in greater detail below. Preferably, document image 212 is displayed by scan privacy tool 200 for the user to edit using a finger or stylus.

Step 68 executes by finalizing the updated document image. The user may press a button or graphic to indicate the edits are complete. Display and edit interface 204 saves the final version of document image 212. Step 70 executes by sending the finalized document image to imaging interface 202. Step 72 executes by relaying the revised document image back to engine firmware 150 for printing operations. Thus, the document image may be revised, such as removing confidential information, prior to printing on MFP 100. One may intercept the document prior to printing without having to make changes on the document at device 14. In some embodiments, the user may change the document at MFP 100 without having to use a word processor or other editor, or having to return to device 14. Time may be saved as well as efficiency increased in printing operations.

Figure 5B:
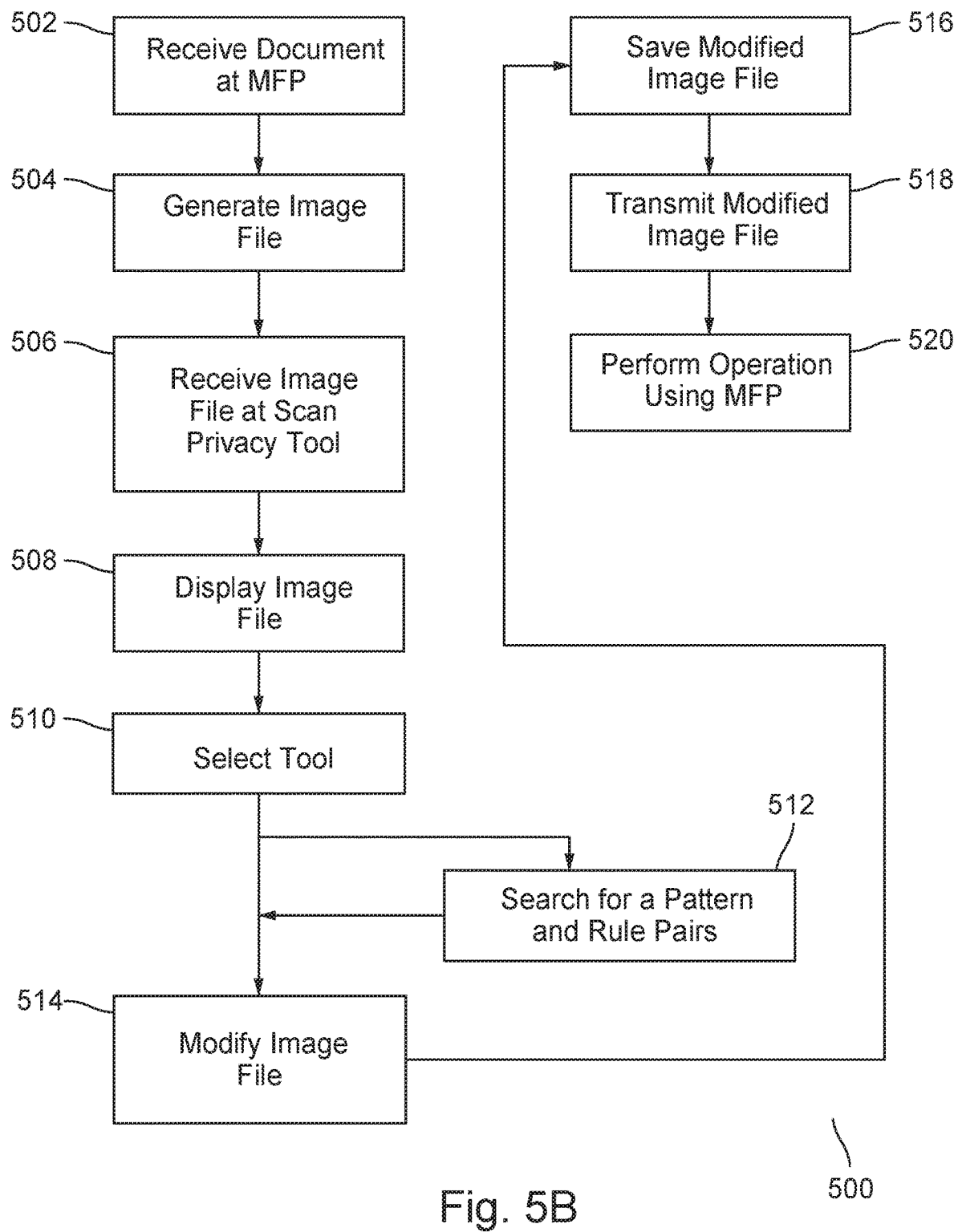
FIG. 5B illustrates a flowchart for modifying a scanned document image using a scan privacy tool according to the disclosed embodiments.

FIG. 5B depicts a flowchart 500 for modifying a scanned document image 212 using scan privacy tool 200 according to the disclosed embodiments. The disclosure for flowchart 500 may include reference to components recited above with regards to FIGS. 1-4 for illustrative purposes. The embodiments disclosed by FIG. 5B, however, are not limited to the components shown in those figures.

Step 502 executes by receiving document 402 at MFP 100. In some embodiments, document 402 is sent to MFP 100 from another device that created the document. This may be seen in FIG. 1A above. Document 402 also may be retrieved from a memory, such as from server 18 in system 10 or storage 208 coupled to MFP 100. In other embodiments, document 402 is placed into document feeder tray 130. Further, document 402 may be more than one page and may contain text and graphics.

Step 504 executes by generating a scanned image file 212 from document 402. Preferably, document 402 is scanned by MFP 100 prior to performing further operations, such as printing, copying, or saving an image file of the document. Scanner flatbed 210 scans document 402. Alternatively, scanned image file 212 may be scanned or generated in another device and sent to MFP 100. Scanned image file 212 may be generated within MFP 100 for privacy tool applications. Scanned image file 212 is an electronic document as opposed to document 402, which may be a physical or hard copy.

Step 506 executes by receiving scanned image file 212 by imaging interface 202 of scan privacy tool 200. Scan privacy tool 200 is a separate component used with or connected to MFP 100. The various physical configurations of scan privacy tool 200 are disclosed above. Preferably, scan privacy tool 200 is hosted on MFP 100 and invoked by pressing a button on operations panel 108. Scan privacy tool 200, however, may be supported by an external device connected to MFP 100. Thus, MFP 100 may send scanned image file 212 to the external device. Alternatively, scanned image file 212 may be initially stored and then provided to scan privacy tool 200 when it is connected to MFP 100.

Step 508 executes by displaying scanned image file 212 on display and edit interface 204 of scan privacy tool 100. Step 510 executes by selecting a tool from toolbox 302 within display and edit interface 204. The tool relates to an action to take with regards to scanned image file 212 and is supported by scan privacy tool library 206.

Step 512 executes by searching for a pattern and at least one modification rule pairs in scan privacy tool library 206. This step may be optional if previous operations have stored patterns and rule pairs using scan privacy tool 200. As disclosed above, modifications on previous documents may be stored and used later by comparing text or graphics in scanned image file 212 to the stored patterns or rule pairs. Using the example above, a password may be searched in subsequent documents and identified as being erased or blurred. This step searches scan privacy tool library 206 for such rules.

Step 514 executes by modifying scanned image file 212 using the scan privacy tool. Step 510 may proceed directly to step 514 if no search is done on patterns or rule pairs within the scanned image file. As disclosed above, the modifications, edits and changes may be performed by touching the screen of display and edit interface 204 to indicated text or graphics using the tool. Step 516 executes by saving the modified scanned image file 212. In some embodiments, the modified scanned image file may be stored on an external device or storage 208. In other embodiments, the modified scanned image file is stored in a memory, such as memory 106, of MFP 100.

Step 518 executes by transmitting modified scanned image file 212 to engine firmware 150 of MFP 100. Step 520 executes by performing operations with the modified image file using MFP 100. These steps correspond to the further actions taken using the modified image file that hides, erases, or modifies the private information in document 402. MFP 100 may print copies of document 402 with the private information erased.

Figure 6:
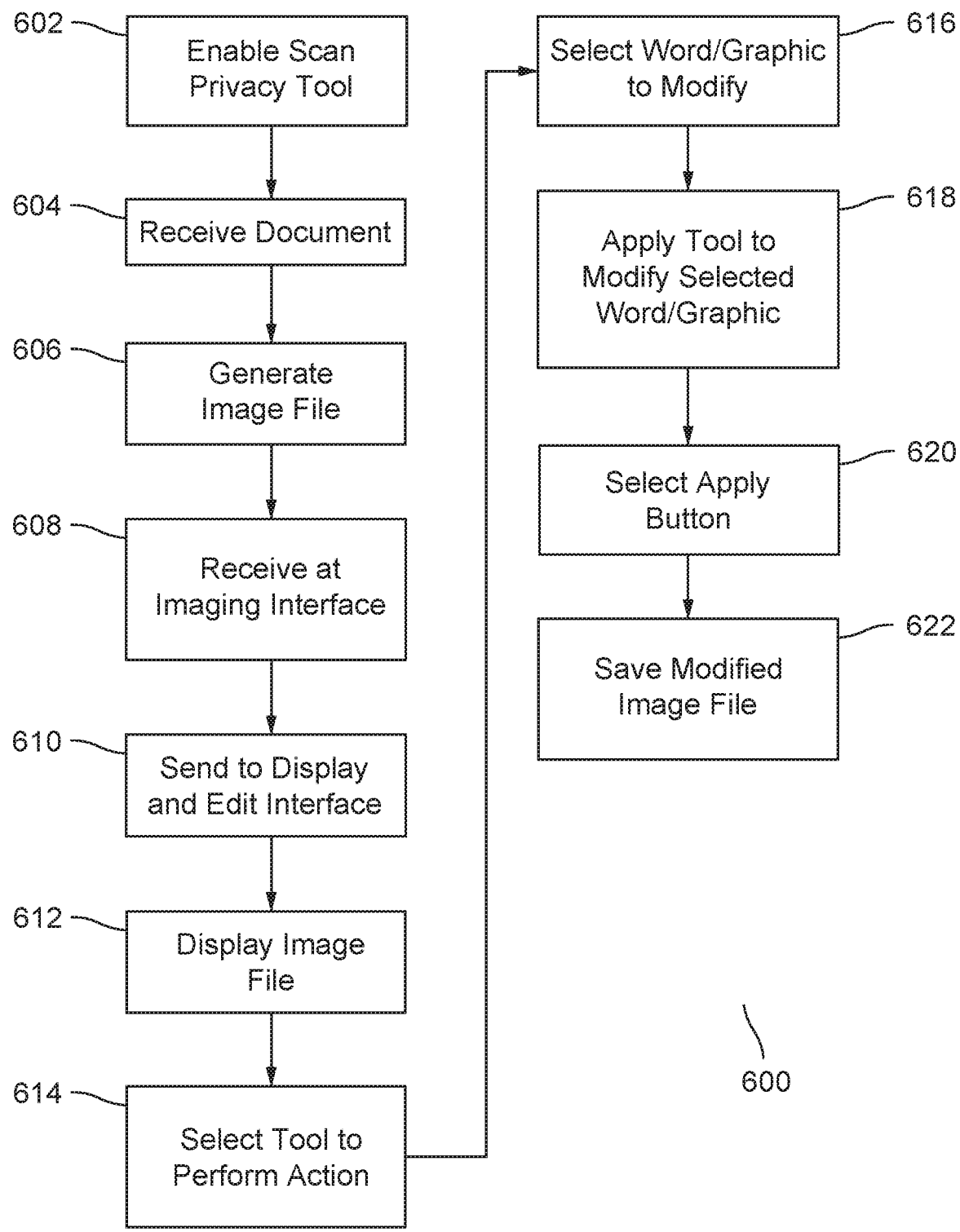
FIG. 6 illustrates a flowchart for using a scan privacy tool with a scanned image file according to the disclosed embodiments.

FIG. 6 depicts a flowchart 600 for using scan privacy tool 200 with scanned image file 212 according to the disclosed embodiments. Flowchart 600 discloses steps similar to flowchart 500 but focuses more on the actions within scan privacy tool 200.

Step 602 executes by enabling scan privacy tool 200. This step may be performed by the user pressing a button on operations panel 108 or other interface, such as within an application, to enable or disable the scan privacy tool feature. The enablement using the button sends a command to MFP 100 to invoke scan privacy tool 200 at the appropriate point within operations to print, copy, scan, fax, and the like. The user also may disable scan privacy tool 200 in this step by pressing a corresponding button.

Step 604 executes by receiving or retrieving document 402. The user may send the document to MFP 100 for a print job. The user may send it from a device connected to MFP 100 over a network. Alternatively, the user may attach a storage device to MFP 100. Further, the user may instruct MFP 100 to retrieve document 402 from a server or other storage on the network. The user may press "start" or another such button on operations panel 108 to commence printing. Step 606 executes by generating image file 212 from document 402. Image file 212 also may be referred to as a "scanned image file" as many jobs on MFP 100 include initially scanning document 402 to then print, copy, save, and the like. If the user does not enable scan privacy tool 200, then document 402 will be directly saved, copied, printed, transmitted, and the like. This will complete flowchart 600. If scan privacy tool 200 is enabled, then the following steps are executed.

Step 608 executes by receiving scanned image file 212 at imaging interface 202 of scan privacy tool 200. Imaging interface 202 may modify the electronic file to be compatible with the other components within scan privacy tool 200. It also may check to see if scanned image file 212 can be supported by scan privacy tool 200. Step 610 executes by sending scanned image file 212 to display and edit interface 204. Step 612 executes by displaying scanned image file 212 within display and edit interface 204 on a touch-screen display either at MFP 100 or within an external connected device.

Step 614 executes by selecting a tool to perform an action using scan privacy tool 200. The "tool" is displayed as a button in toolbox 302 and relates to a function supported by scan privacy tool library 206. The function allows the user to complete an action to modify scanned image file 212. Step 616 executes by selecting a word or graphic to modify within scanned image file 212. The user can select word using a finger, stylus, digital pen, and the like to identify private information within the scanned image of the document. The user also may select figures, logos, numbers, and the like.

Step 618 executes by applying the tool to modify the selected word or graphic. In some embodiments, scan privacy tool library 206 includes API 2064 that detects the background of the selected private information and uses it to erase or modify any foreground color that the user has touched or identified. For example, a word may be erased by detecting the page of the scanned document image and erasing the text color. The user also may select other tools to use for modifying private information within scanned document image 212. The user also may set pattern rule pairs using pattern rule box 304.

Once the user is done with the modifications, step 620 executes by applying the modifications to scanned document image 212. This may be done by pressing or clicking a "Done" or "Apply" button in display and edit interface 204. Step 622 executes by saving the modified image file and proceeding to the rest of the regular workflow within MFP 100. The modified scanned document image provided by scan privacy tool 200 will be saved, copied, printed, faxed, transmitted, and the like. Further, scan privacy tool 200 may save the modified image file to an external storage for later use.

Figure 7:
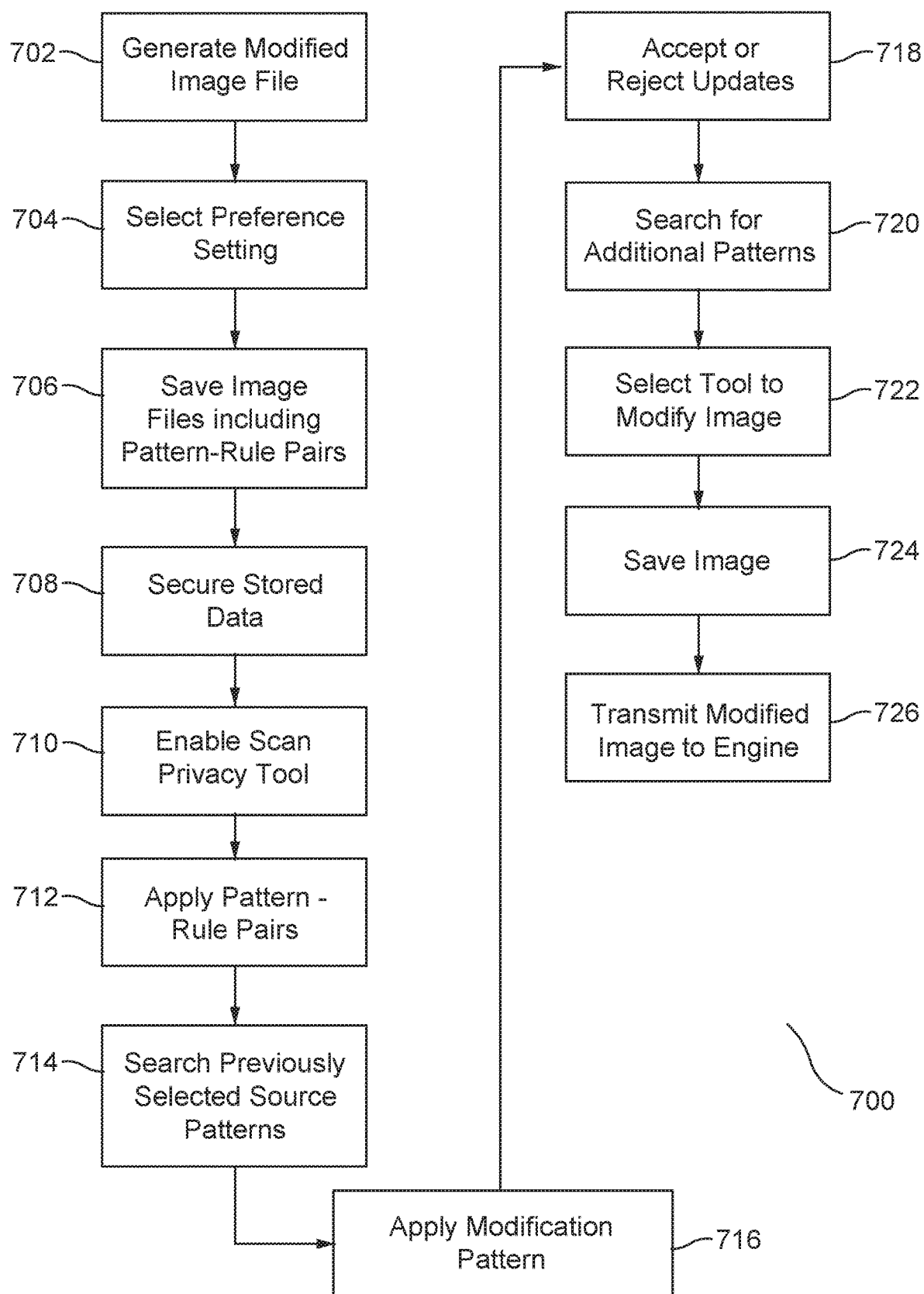
FIG. 7 illustrates a flowchart for pattern recognition and caching using a scan privacy tool according to the disclosed embodiments.

FIG. 7 depicts a flowchart 700 for pattern recognition and caching using scan privacy tool 200 according to the disclosed embodiments. As pieces of confidential and private information are selected and replaced, the original source pattern and the modification pattern may be saved so that a re-occurrence of the source pattern in the same page or in the same document, or subsequent pages and documents, may be replaced with the modification pattern that the user created using the library tools. The original source pattern may be scanned image file 212 provided from scanner flatbed 210 and displayed on display and edit interface 204. The modification pattern is the modified scanned document image that has private information 306-312, for example, changed from the original source pattern. The original source pattern and modification pattern may be known as pattern pair.

Step 702 executes by generating the modified image file based on scanned image file 212. This step generates the original source pattern and modification pattern images used in flowchart 700. The original source pattern and modification pattern also include a rule based on a preference setting or policy.

Step 704 executes by selecting the rule or preference setting to be used with the pattern pair. The preference setting may be selected from pattern rule box 304, as shown in FIG. 3. The preference settings may include an "all pages" box. This setting is a global search and replace rule that applies to all pages in the current scanned job. If checked, then the source pattern will be recognized and search from the current page location forward and replaced with the modifications made by the user on scanned image file 212. This setting may not be saved or may not be permanent for future scanned jobs.

Pattern rule box 304 also includes a "this page only" box. This setting is a local search and replace setting for the current page. The source pattern will be modified only on the current page of scanned image file 212. A source pattern and a modification pattern may not be saved nor cached using this setting.

The "always" box allows the user to create pattern-rule pairs using the original source pattern and the modification pattern. This setting is a permanent search and replace for all subsequent jobs using scan privacy tool 200. The source pattern is modified for all pages in the current scanned job with a modification pattern generated as well. The pair of data for the patterns will be saved and available for use in future operations using MFP 100 and scan privacy tool 200.

Step 706 executes by saving the image files including any pattern-rule pairs. As there may be a lot of pages to be scanned, storage in the memory on MFP 100 may not be practical, especially if other jobs to print, copy, fax and the like may arrive and need to be processed. When MFP 100 is not busy, a local hard drive or memory, such as memory 114, may be used. If no memory is available on MFP 100, then the scanned document images, original source pattern images, and modification pattern images may be saved and cached in external storage, such as storage 208. Alternatively, the images may be saved to an external hard-drive, network storage, a database, cloud storage, and the like.

When the source pattern images and modification pattern images are stored in storage 208 and the like, the user will be able to re-use these images and the patterns for future scanning of the same document. The images and patterns also may be used on other documents that may have the same or similar private, or confidential, information within the text or graphics. Step 708 executes by securing this data within a database within the storage with a password and encryption. Thus, only authorized users may be able to access the original source documents and images that include the private information. The database includes pairs of source patterns and modification patterns and may be encrypted using a high-encryption algorithm.

Step 710 executes by enabling scan privacy tool 200 for a job on MFP 100. After the user presses "start" or a similar command, scanned document image 212 is not immediately printed or processed. Instead, it is made available to the user via scan privacy tool 200 to make corrections, edits, modifications, and the like. Scan privacy tool 200 also may retrieve the pattern-rule pairs from the database.

Step 712 executes by applying the pattern-rule pairs to scanned document image 212 by scan privacy tool library 206. The user may select with pattern-rule pairs to apply. Those having the preference setting of "always" will be automatically applied to scanned image 212. Step 714 executes by searching previously selected source patterns using image processing. Scan privacy tool library 206 performs scaling, shrinking, skewing, color adjustment, color conversions, and the like in order to search image patterns in scanned document image 212.

Step 716 executes by applying the modification pattern if the source pattern is identified in step 714 in scanned document image 212. Scan privacy tool library 206 finds private information within scanned document image 212 that corresponds to a source pattern saved in storage 208. Scan privacy tool 200 then may apply the modification pattern previously created for the source pattern in an earlier job.

Step 718 executes by accepting or rejecting the updates to scanned document image 212 that are applied using the modification pattern by scan privacy tool 200 based on the previously selected pattern-rule pairs. Those page objects that were auto-corrected or auto-updated will appear in edit and display interface 204 as editable objects within scanned document image 212. The user may drag away, or reject, the overlaid auto-correction or auto-update effects so that they will not be applied for that object. In some embodiments, the user can reject the modification to the scanned document image going forward in the process. The pattern-rule pair may be disabled throughout the document image.

Step 720 executes by searching for additional patterns within scanned document image 212. In some embodiments, optical character recognition (OCR) technology may be used to search textual patterns, as opposed to image patterns, that are specified from the user interface or other tools provided to the user. In other words, the user also may input patterns for which to search in scanned document image 212.

Step 722 executes by selecting a tool from toolbox 302 to modify scanned document image 212. If the user finds other page objects or contents as private information, then a selected tool applies the rules specified in pattern rule box 304 to the changes. In other words, the user may go through the processes disclosed above in FIGS. 5 and 6. The search feature of step 720 also may be used to identify private information in the objects and this step to make the desired edits to scanned document image 212.

Step 724 executes by saving the modified scanned document image. Any new source pattern and modification pattern pairs will be saved along with rules applied during changes using the selected tool. Thus, newly created pattern-rule pairs are saved. Through the use of the OCR technology, text patterns are extracted for use in future searches and to complement image pattern searching. Step 726 executes by transmitting the modified image document to engine firmware 150 of MFP 100 for completing the job.

Figure 8:
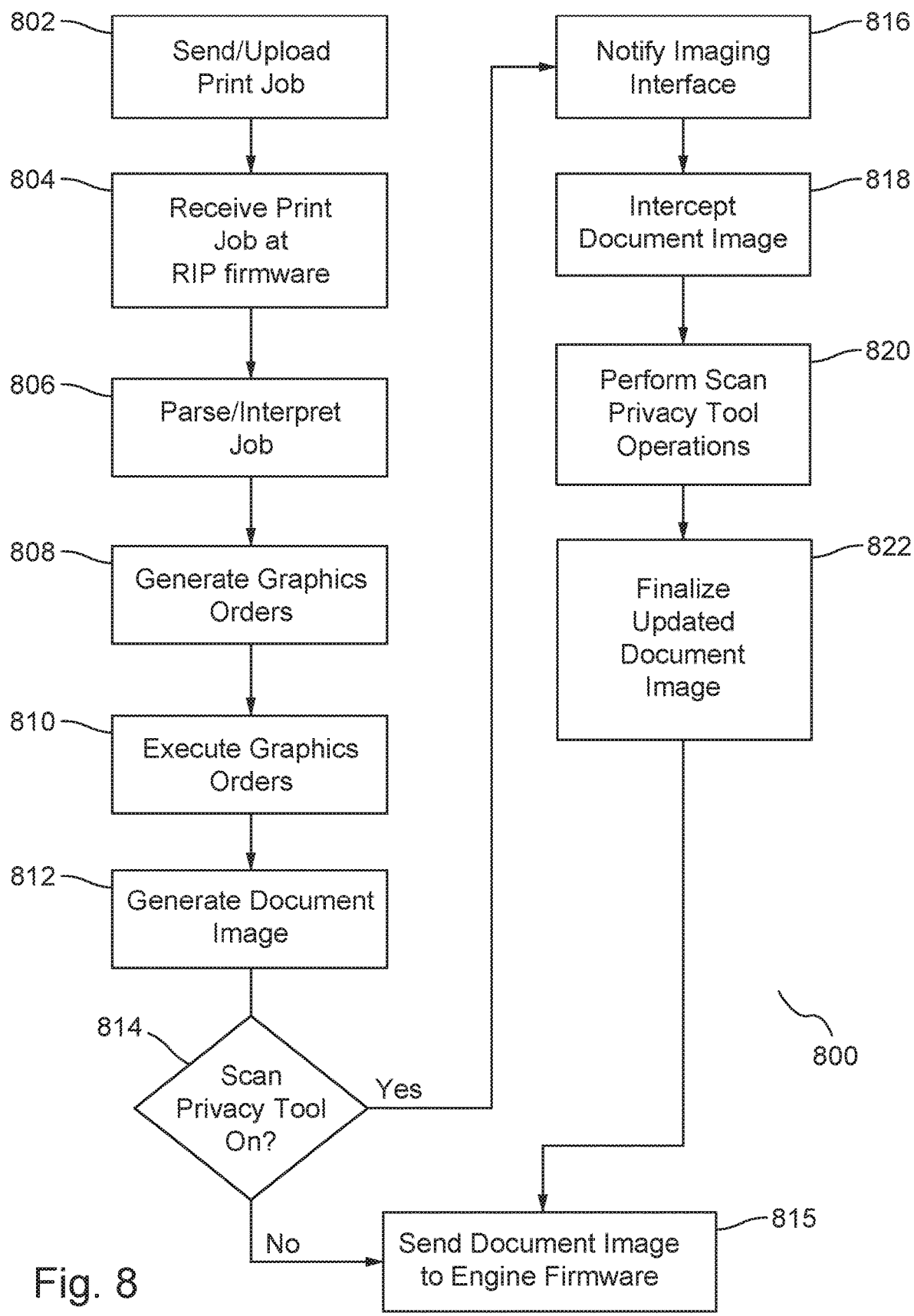
FIG. 8 depicts a flowchart for printing a document on multi-functional printer using a scan privacy tool according to the disclosed embodiments.

FIG. 8 depicts a flowchart 800 for printing a document on MFP 100 using scan privacy tool 200 according to the disclosed embodiments. Flowchart 800 may be implemented in addition to the processes disclosed above. The operations disclosed by flowchart 800 will be described in conjunction with the MFP 100 and scan privacy tool 200 architecture shown in FIG. 2B. This architecture may use controller 250 as well as engine firmware 150. In summary, the process disclosed by FIG. 8 includes sending print jobs to MFP 100, processing the print jobs by RIP firmware 252, checking to see if scan privacy tool 200 is turned on or off, and following the workflow disclosed above for scan privacy tool 200.

Step 802 executes by sending a print job to MFP 100 from an application via a printer driver on a device. For example, device 14 may include a printer driver that executes thereon to send print jobs to MFP 100. The user selects the document to be printed using the application. Alternatively, the user can upload or select a document from a portable device, network storage, cloud storage, mobile device, and the like to be the print job.

Step 804 executes by receiving the print job at RIP firmware 252 within controller 250. RIP firmware 252 may receive the print job as a stream of data from over network 12. Step 806 executes by parsing and interpreting the incoming print job by PDL interpreter 254. Step 808 executes by generating graphics orders by PDL interpreter 254. Thus, the stream of data is received RIP firmware 252 and converted into graphics orders.

Step 810 executes by executing the graphics orders by graphics rendering component 256. Graphics rendering component 256 translates the graphics orders to shapes, lines, figures, colors, markings, and other image processing operations to create a logical representation of the pages of the document for the print job. The logical representation also may be known as document image 212, disclosed above. Step 812 executes by generating document image 212 by RIP firmware 252.

Step 814 executes by determining whether scan privacy tool 200 is turned on. In other words, the button or other toggle device has been selected to enable scan privacy tool 200. For example, a button may be engaged on operations panel 108 to turn on the scan privacy tool. If no, then step 815 executes by RIP firmware 252 sending document image 212, as is, to engine firmware 150 for further printing operations.

If step 814 is yes, then step 816 executes by notifying imaging interface 202 of the availability of document image 212. Further, before the print job or documents are actually printed, saved, or transmitted, the printing operations are suspended. Nothing is sent to engine firmware 150. Step 818 executes by intercepting document image 212. Imaging interface 202 will retrieve document image 212 and send it to display and edit interface 204, as disclosed above.

Step 820 executes by performing scan privacy tool operations using scan privacy tool 200, as disclosed above. Scan privacy tool 200 may apply prior pattern-rule pairs identified and saved in previous edits of documents. The user also interacts with display and edit interface 204 to perform and apply the tools and effects provided in scan privacy tool library 206. For example, information may be blurred using the tools and display and edit interface 204.

Step 822 executes by finalizing updated document image 212. The edits and changes made to the document image may be saved. The selection of a button to finalize the changes may occur on display and edit interface 204. Updated document image 212 is sent back to imaging interface 202. The user also may select an "undo" button to reverse or override any edit or changes to document image 212. The original document image may be refreshed in display and edit interface 204. Flowchart 800 proceeds to step 815 with imaging interface 202 sending updated document image 212 to engine firmware 150 for printing, saving, or transmission.

According to one preferred embodiment of the invention, the scan privacy tool function may be executed at a mobile device to retrieve and edit document files from other computing devices. Such a mobile device may be the devices 14 and 16 of FIG. 1A, that use a scan privacy tool 200 shown in FIGS. 1B-3, to intercept and edit the document before sending it to the MFP 100 for printing. The mobile device may also retrieve the document from a printer pipeline even though the document has been sent out in a queue for printing.

Figure 9:
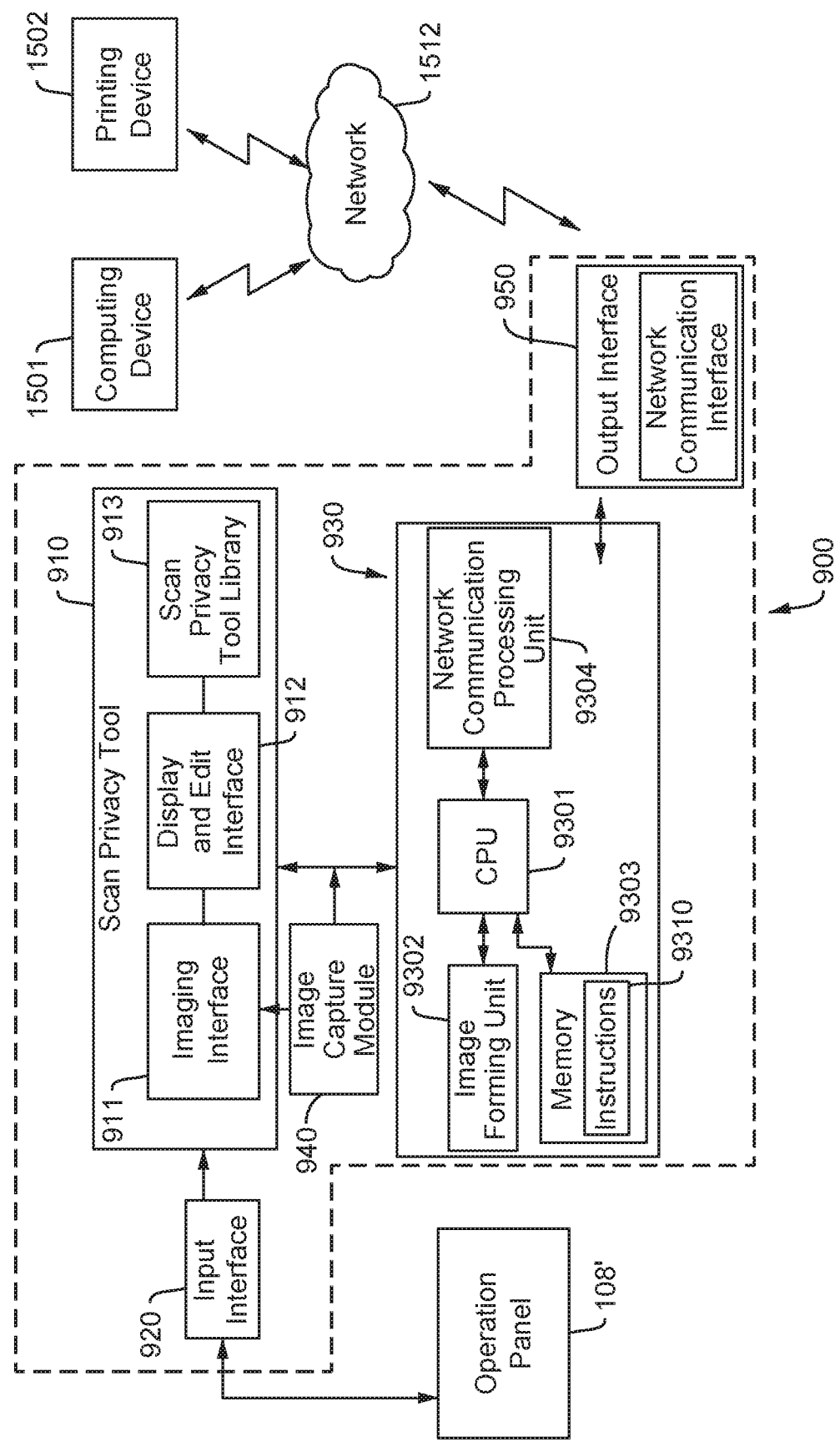
FIG. 9 illustrates a block diagram of a mobile device including a scan privacy tool according to the disclosed embodiments.

FIG. 9 depicts a block diagram of a mobile device 900 having a function of a scan privacy tool 910 according to the disclosed embodiments. According to the preferred embodiments, the scan privacy tool 910 may be sent from a computing device 1501 via a network 1512 and is installed in the mobile device 900. The scan privacy tool 910 may also be a built-in tool of the mobile device 900 during manufacturing. In preferred embodiments, the mobile device may include a tablet, a smartphone, a computer, a server, or a scanner. The computing device 1501 may be a server, a scanner, a computer, a smart phone, a tablet, and/or a printing system 1502, such as the MFP 100 of FIG. 1.

In addition to scan privacy tool 910, mobile device 900 further includes an input interface 920, a computer platform 930, an image capture module 940, and an output interface 950. Input interface 920 interacts with an operations panel 108' that is similar to operations panel 108 of the MFP 100. Operations panel 108' may be at a separate device from mobile device 900. Operations panel 108' may also be embodied in mobile device 900 integrated with input interface 920. Input interface 920 receives image files from the MFP 100 or other computing devices 1501 via network 1512, and sends the received image files to the scan privacy tool 910 for processing.

Computer platform 930 is similar to computer platform 101 of MFP 100 of FIG. 1B. The computer platform 930 interacts with input interface 920, scan privacy tool 910, and output interface 950, and includes a CPU 9301, an image forming unit 9302, a memory unit 9303, and a network communication interface 9304. CPU 9301 is capable of executing instructions 9310 stored at one or more storage locations in the memory unit 9303. Image forming unit 9302 may process images captured from an image capture module 950 and images received from scan privacy tool 910 after being edited or modified by scan privacy tool 910.

Scan privacy tool 910 includes an image interface 911, a display and edit interface 912, and a scan privacy library 913. The detailed descriptions of scan privacy tool 910 have been described in FIGS. 1A-4 as above. The features of scan privacy tool 200 may be incorporated into scan privacy tool 910. To avoid confusion, the image interface 911 receives image files from input interface 920 and provides such image files to be displayed on display and edit interface 912. Display and edit interface 912 may act as an interactive interface that allows a user to edit and modify, at mobile device 900, the displayed image file according to rules stored in scan privacy tool library 913.

Mobile device 900 is configured to intercept and edit image files and/or document files from computing device 1501 via network 1512 before or after the image files are sent to printer pipeline according to preferred embodiments. However, mobile device 900 may also generate image files locally. In this case, the image file is scanned or captured by image capture module 940. Similar to the image files received from computing device 1501, the captured image files are displayed on display and edit interface 912 and are modified according to a predetermined set of rules stored in scan privacy tool library 913. In preferred embodiments, scan privacy tool 910 edits and modifies a portion of the image file using a tool stored in scan privacy tool library 913. Scan privacy tool library 913 stores the modified portion of the image file as a modification pattern paired to the portion of the image file before being modified, and applies the set of rules and the modification pattern to the image file during the modification process.

After the image file is edited and modified as described above, computing platform 930 processes the edited image files and outputs the edited image file via output interface 950 to a printing device 1502 for printing. Together with the edited image file, CPU 9301 may send at least one instruction with the edited image file to an engine firmware of the printing device, such as 150 in FIG. 1B. The at least one instruction activates the engine firmware to perform an action.

Further, rules and applications for modification of the image files are disclosed in accordance with FIG. 3, as above.

Figure 10:
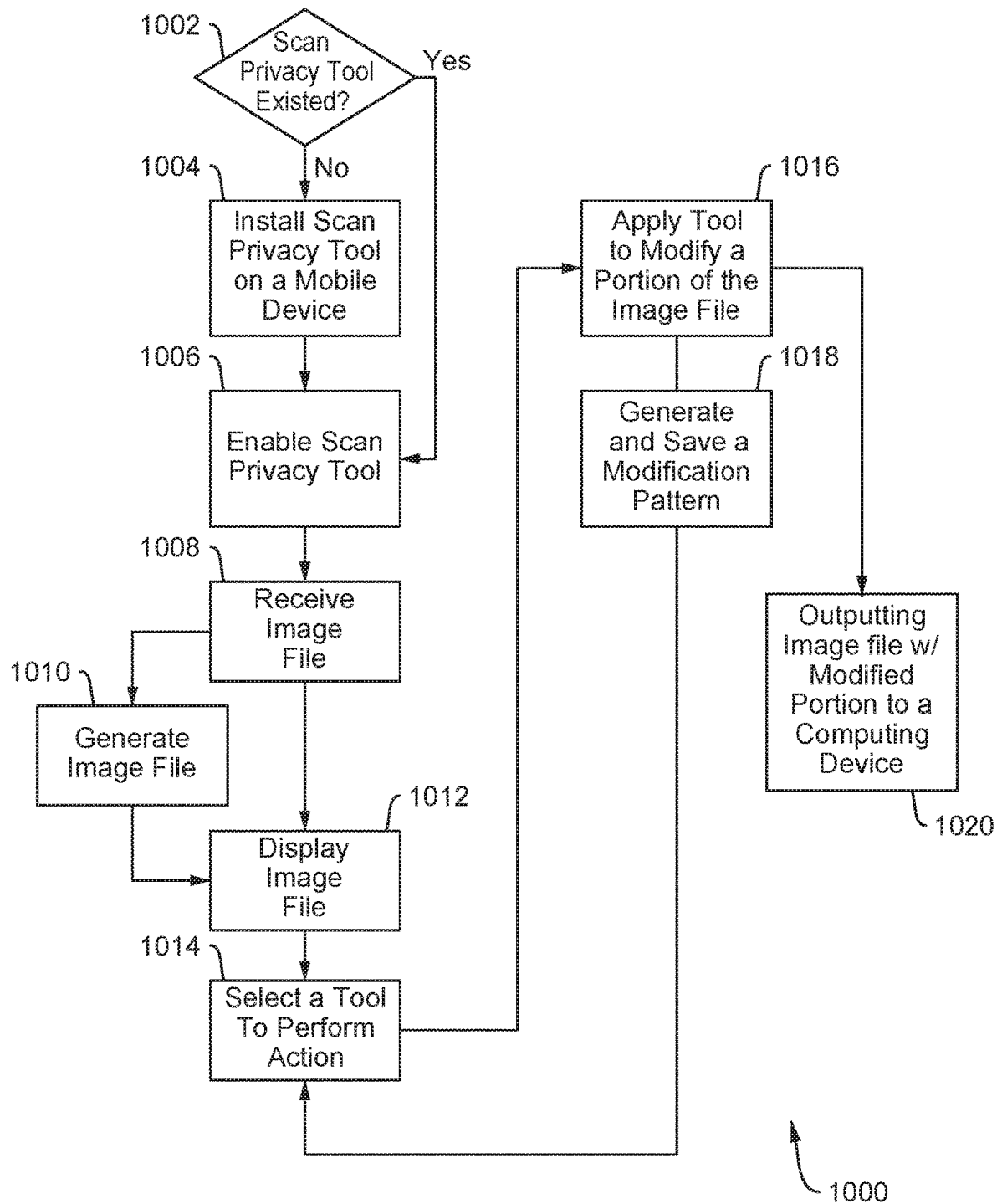
FIG. 10 illustrates a flowchart for using a mobile device including a scan privacy tool to edit and modify image files before the files are printed by a printing device according to the disclosed embodiments.

FIG. 10 depicts a flowchart 1000 for implementing scan privacy tool 910 on mobile device 900 according to the disclosed embodiment. The operations disclosed by flowchart 1000 will be described in conjunction with mobile device 900 and scan privacy tool 910, 200 architecture shown in FIGS. 2-5 and 9 and MFP 100 architecture shown in FIG. 2B. These features of FIGS. 2-5 and 9, however, do not limit the embodiments disclosed by flowchart 1000.

According to the disclosed embodiments, the image files are edited and/or modified at mobile device 900 before being printed. Mobile device 900 is capable of intercepting and retrieving image files to be edited before the files are sent to a printer or after the files are sent to a printing pipeline. To do so, mobile device 900 includes a scan privacy tool function.

Step 1002 executes by determining if mobile device 900 includes scan privacy tool 910. If not, step 1004 installs scan privacy tool 910 to mobile device 500. Scan privacy tool 910 may be sent from computing device 15, 14, and 16 via network 12 of FIG. 1A or from computing device 1501 of FIG. 9. Scan privacy tool 910 may also be a built-in component of mobile device 900. In some embodiments, scan privacy tool 910 may act as an application on mobile device 900. The application configures mobile device 900 to act as a special purpose device to enable scan privacy tool 910. As such, scan privacy tool 910 performs specific functions and processes apart from general computer or mobile device operations, as disclosed in greater detail below.

Step 1006 executes by enabling scan privacy tool 910. Step 1008 executes by receiving image files. The image files may be received from computing device 1501 via network 1512 or received locally from image capture module 940. According to the disclosed embodiments, mobile device 900 may be in a form of a smartphone, a server, a computer, a tablet, a scanner, and the like. As such, image capture module 940 may be a camera or a scanning element configured to capture images. Step 1010 executes by processing the captured images received from image capture module 940 or from computing device 1501 using computer platform 930 to generate image files for editing by scan privacy tool 910.

Step 1012 executes by displaying image files on display and edit interface 912. Step 1014 then executes by selecting a tool from scan privacy library 913 to edit and modify the image files. According to preferred embodiments, the tool includes predetermined rules that can be chosen and interacted by users.

Once a tool is selected, step 1016 applies the tool to modify the image file. Preferably, the tool modifies a portion of the image file and generates a modification pattern of the modified portion in relation to the portion before being modified, at step 1018. The modification pattern may be saved to scan privacy tool library 913 for later use, but is not limited to such an application.

Step 1020 executes by outputting the image file with the modified portion to a computing device, such device 1501, or a printing device 1502, via network 1512 for printing.

Thus, a printing system is able to present a scanned document image using the scan privacy tool so that edits, changes, and modifications can be made without having to send the document image to a computer or use known methods of hiding information within the document. Moreover, the patterns created during the modification of the document may be stored for future use in printing or scanning operations. The scan privacy tool includes a display and edit interface that is displayed at the MFP device or on an external device having a touch screen. The user selects a tool from the interface and applies the functions of the tool in making the changes to the scanned document image. The modified document image may be saved or sent to an engine within the MFP device for further jobs, such as printing, faxing, copying, and the like. The changes to remove or obscure the private information are implemented during the jobs.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A mobile device for editing an image file in a printing system having a printing device, comprising:
    a receiving interface for retrieving and receiving an image file from a computing device;
    a scan privacy tool, including:
        an image interface to store the image file;
        a display and edit interface to receive the image file from the image interface, to display the image file, and to edit and modify a portion of the image file by a tool stored in a scan privacy tool library in accordance with a set of rules, wherein the set of rules is pre-determined rules that is chosen and determined at the mobile device based on modification requirements for the image file; and
        the scan privacy tool library to support the tool to modify the portion of the image file as displayed by the display and edit interface, and to store the modified portion of the image file as a modification pattern paired to the portion of the image file before being modified, and to apply the set of rules and the modification pattern to the image file during the modification process, wherein the tool is a software component and the modified portion is made private by the tool; and
    an output interface for sending the image file with the modified portion to the printing device for printing.

2. The mobile device of claim 1, further comprising a processor configured to send at least one instruction with the image file including the modified portion to an engine firmware of the printing device, wherein the at least one instruction is configured to activate the engine firmware of the printing device.

3. The mobile device of claim 1, wherein the scan privacy tool is in a form of application installed in the mobile device.

4. The mobile device of claim 1, wherein the scan privacy tool is in a form of software that is sent from the computing device via a network.

5. The mobile device of claim 1, wherein the image file is stored at the computing device and is accessible by the mobile device via a network.

6. The mobile device of claim 1, wherein the mobile device is configured to intercept the image file from the computing device before the image file is sent to the printing device.

7. The mobile device of claim 1, wherein the mobile device is configured to retrieve the image file from the printing device after the image file is sent to a printing pipeline.

8. The mobile device of claim 1, wherein the computing device is one of a smartphone, a tablet, a computer, a mobile scanner, and the printing device.

9. The mobile device of claim 1, being one of a smartphone, a tablet, a computer, and a mobile scanner.

10. A mobile device for editing an image file in a printing system having a printing device, comprising:
    a database for storing the image file, wherein the image file is scheduled to be sent to the printing device for printing;
    a scan privacy tool, including:
        an image interface to retrieve the image file from the database and to store the image file;
        a display and edit interface to receive the image file from the image interface, to display the image file on the display and edit interface, and to edit and modify a portion of the image file by a tool stored in a scan privacy tool library in accordance with a set of rules, wherein the set of rules is pre-determined rules that is chosen and determined at the mobile device based on modification requirements for the image file; and
        the scan privacy tool library to support the tool to modify the portion of the image file as displayed by the display and edit interface, and to store the modified portion of the image file as a modification pattern paired to the portion of the image file before being modified, and to apply the set of rules and the modification pattern to the image file during the modification process, wherein the tool is a software component and the modified portion is made private to the scan privacy tool; and
    an output interface for sending the image file with the modified portion to the printing device for printing.

11. The mobile device of claim 10, further comprising a processor configured to send at least one instruction with the image file including the modified portion to an engine firmware of the printing device, wherein the at least one instruction is configured to activate the engine firmware.

12. The mobile device of claim 10, further comprising an image capture module for capturing the image file and stores the image file in the database.

13. The mobile device of claim 10, wherein the scan privacy tool is in a form of application installed in the mobile device.

14. The mobile device of claim 10, wherein the scan privacy tool is in a form of software that is sent from a computing device via the network.

15. The mobile device of claim 10, being one of a smartphone, a server, a tablet, a computer, and a scanner.

16. A method for editing an image file on a mobile device before the image file is printed, the method comprising:
    retrieving the image file from a computing device via a network;
    displaying the image file on a display unit of the mobile device;
    enabling a scan privacy tool to edit the displayed image file, including:
        identifying a portion of the image file having characters that are required to be edited,
        selecting a tool from a plurality of tools supported by the scan privacy tool, and
        modifying the portion of the image file using the selected tool of the scan privacy tool, and storing the modified portion of the image file as a modification pattern paired to the portion of the image file before being modified in a scan privacy tool library, wherein the modified portion of the image file is made private to the scan privacy tool, an wherein the tool uses a set of rules and the modification pattern to modify the image file; and
    transmitting the image file with the modified portion to an engine of a printing device.

17. The method of claim 16, further comprising configuring at least one instruction to be sent together with the image file including the modified portion, wherein the at least one instruction is configured to activate the engine of the printing device.

18. The method of claim 16, further comprising installing the scan privacy tool to the mobile device via a network.

19. The method of claim 16, further comprising capturing the image file at the mobile device and sending the captured image file to the display unit to be edited by the scan privacy tool.

20. The method of claim 16, further comprising applying the rules and the modification pattern in the image file using a scan privacy tool library of the scan privacy tool.

* * * * *